US012560450B2

(12) United States Patent
Shin et al.

(10) Patent No.: US 12,560,450 B2
(45) Date of Patent: Feb. 24, 2026

(54) METHOD AND SERVER FOR GENERATING SPATIAL MAP

(71) Applicant: SAMSUNG ELECTRONICS CO., LTD., Suwon-si (KR)

(72) Inventors: Jaewook Shin, Suwon-si (KR); Dongchan Kim, Suwon-si (KR); Dongnam Byun, Suwon-si (KR); Jinyoung Hwang, Suwon-si (KR); Sejin Kwak, Suwon-si (KR); Geunho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

(21) Appl. No.: 18/370,595

(22) Filed: Sep. 20, 2023

(65) Prior Publication Data

US 2024/0118103 A1 Apr. 11, 2024

Related U.S. Application Data

(63) Continuation of application No. PCT/KR2023/013661, filed on Sep. 12, 2023.

(30) Foreign Application Priority Data

Oct. 7, 2022 (KR) ........................ 10-2022-0129041
Dec. 14, 2022 (KR) ........................ 10-2022-0174950

(51) Int. Cl.
*G01C 21/00* (2006.01)
*G01C 21/20* (2006.01)
(Continued)

(52) U.S. Cl.
CPC ........ *G01C 21/3811* (2020.08); *G01C 21/206* (2013.01); *G01C 21/32* (2013.01);
(Continued)

(58) Field of Classification Search
CPC ............... G01C 21/3811; G01C 21/32; G01C 21/3859; G06T 7/30; G06T 3/14; G06T 15/04; G06T 19/20; G06V 10/44
See application file for complete search history.

(56) References Cited

U.S. PATENT DOCUMENTS 7,698,060 B2 4/2010 Nomura
9,288,635 B2 3/2016 Yoo et al.
(Continued)

FOREIGN PATENT DOCUMENTS

CN 107248176 B 6/2020
CN 114791917 A 7/2022
(Continued)

OTHER PUBLICATIONS

Saeed et al., "2D Map Alignment With Region Decomposition", Jun. 30, 2018, Published on arxiv, https://arxiv.org/abs/1709.00309 (Year: 2018).*
(Continued)

*Primary Examiner* — Zhengxi Liu
*Assistant Examiner* — Thang Gia Huynh
(74) *Attorney, Agent, or Firm* — Sughrue Mion, PLLC

(57) ABSTRACT

Provided is a method, performed by a server, of providing a personalized spatial map, the method comprising: obtaining a first spatial map including first map features representing spatial information about a space; obtaining a second spatial map based on sensor data obtained by measuring the space, the second spatial map including second map features; identifying third map features for map alignment from among the first map features and the second map features; aligning the first spatial map and the second spatial map, based on the identified third map features; identifying local areas in the space where at least one difference exists between the first spatial map and the second spatial map; and
(Continued)

generating the personalized spatial map by identifying pieces of spatial information about the local areas based on the second map features.

18 Claims, 23 Drawing Sheets

(51) Int. Cl.

| | |
|---|---|
| *G01C 21/32* | (2006.01) |
| *G06T 7/30* | (2017.01) |
| *G06T 15/04* | (2011.01) |
| *G06T 19/20* | (2011.01) |

(52) U.S. Cl.
CPC ....... *G01C 21/383* (2020.08); *G01C 21/3859* (2020.08); *G06T 7/30* (2017.01); *G06T 15/04* (2013.01); *G06T 19/20* (2013.01)

(56) References Cited

U.S. PATENT DOCUMENTS

| | | | |
|---|---|---|---|
| 9,864,766 | B2 | 1/2018 | Scharmann et al. |
| 9,952,053 | B2 | 4/2018 | Fong et al. |
| 10,482,655 | B2 | 11/2019 | Chen et al. |
| 11,042,748 | B2 | 6/2021 | Witt et al. |
| 11,302,031 | B2 | 4/2022 | Shin et al. |
| 11,674,809 | B2 | 6/2023 | Choi |
| 12,235,112 | B1* | 2/2025 | Arnicar .............. G01C 21/3815 |
| 2011/0187704 | A1 | 8/2011 | Chen et al. |

| | | | |
|---|---|---|---|
| 2018/0066946 | A1* | 3/2018 | Booth .................... G01S 19/41 |
| 2020/0098135 | A1 | 3/2020 | Ganjineh et al. |
| 2021/0080964 | A1* | 3/2021 | Molina Cabrera ..... G06F 9/452 |

FOREIGN PATENT DOCUMENTS

| | | |
|---|---|---|
| EP | 4 283 484 A1 | 11/2023 |
| JP | 4162959 B2 | 10/2008 |
| KR | 10-0933877 B1 | 12/2009 |
| KR | 10-2014-0050209 A | 4/2014 |
| KR | 10-2019-0121275 A | 10/2019 |
| KR | 10-2021-0004674 A | 1/2021 |
| KR | 10-2022-0001274 A | 1/2022 |
| WO | 2019/054209 A1 | 3/2019 |

OTHER PUBLICATIONS

Yang et al., "An Efficient Spatial Representation for Path Planning of Ground Robots in 3D Environments", Aug. 15, 2018, Published on IEEE Access, https://ieeexplore.ieee.org/stamp/stamp.jsp?arnumber=8418378 (Year: 2018).*

Wang et al., "Geometry consistency aware confidence evaluation for feature matching", Aug. 5, 2020, Published on Image and Vision Computing, vol. 103, https://doi.org/10.1016/j.imavis.2020.103984 (Year: 2020).*

International Search Report and Written Opinion issued Dec. 18, 2023 by the International Searching Authority in International Patent Application No. PCT/KR2023/013661 (PCT/ISA/220, PCT/ISA/210 and PCT/ISA/237).

Communication dated Sep. 16, 2025, issued by the European Patent Office in European Application No. 23875088.9.

* cited by examiner

FIG. 1

FIG. 4
FIRST SPATIAL MAP   410
SECOND SPATIAL MAP   420
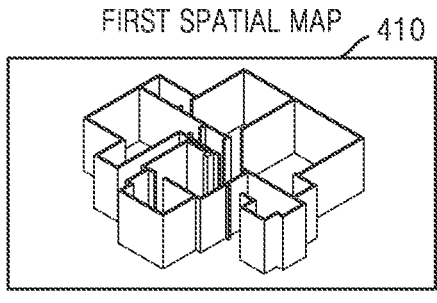
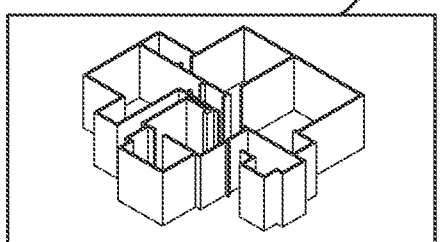
412
FIRST MAP FEATURES
LAYOUT INFORMATION
– WALLS
OBJECT INFORMATION
– POSITION
– HEIGHT
– TYPE
3D INFORMATION
– 3D
– HEIGHT INFORMATION
(NO HEIGHT LIMITATION)
422
SECOND MAP FEATURES
LAYOUT INFORMATION
– WALLS
– DOORS
OBJECT INFORMATION
– POSITION
– HEIGHT
– TYPE
3D INFORMATION
– 3D
– HEIGHT INFORMATION
(HEIGHT REFLECTED
IN MAP PRODUCTION)

S320

S510

PROJECT HIGHER DIMENSIONAL SPATIAL MAP
AMONG FIRST SPATIAL MAP AND SECOND SPATIAL
MAP TO CORRESPOND TO SPATIAL DIMENSION OF
LOWER DIMENSIONAL SPATIAL MAP, BASED ON
SPATIAL DIMENSION OF FIRST SPATIAL MAP BEING
DIFFERENT FROM THAT OF SECOND SPATIAL MAP

Figure 5B:
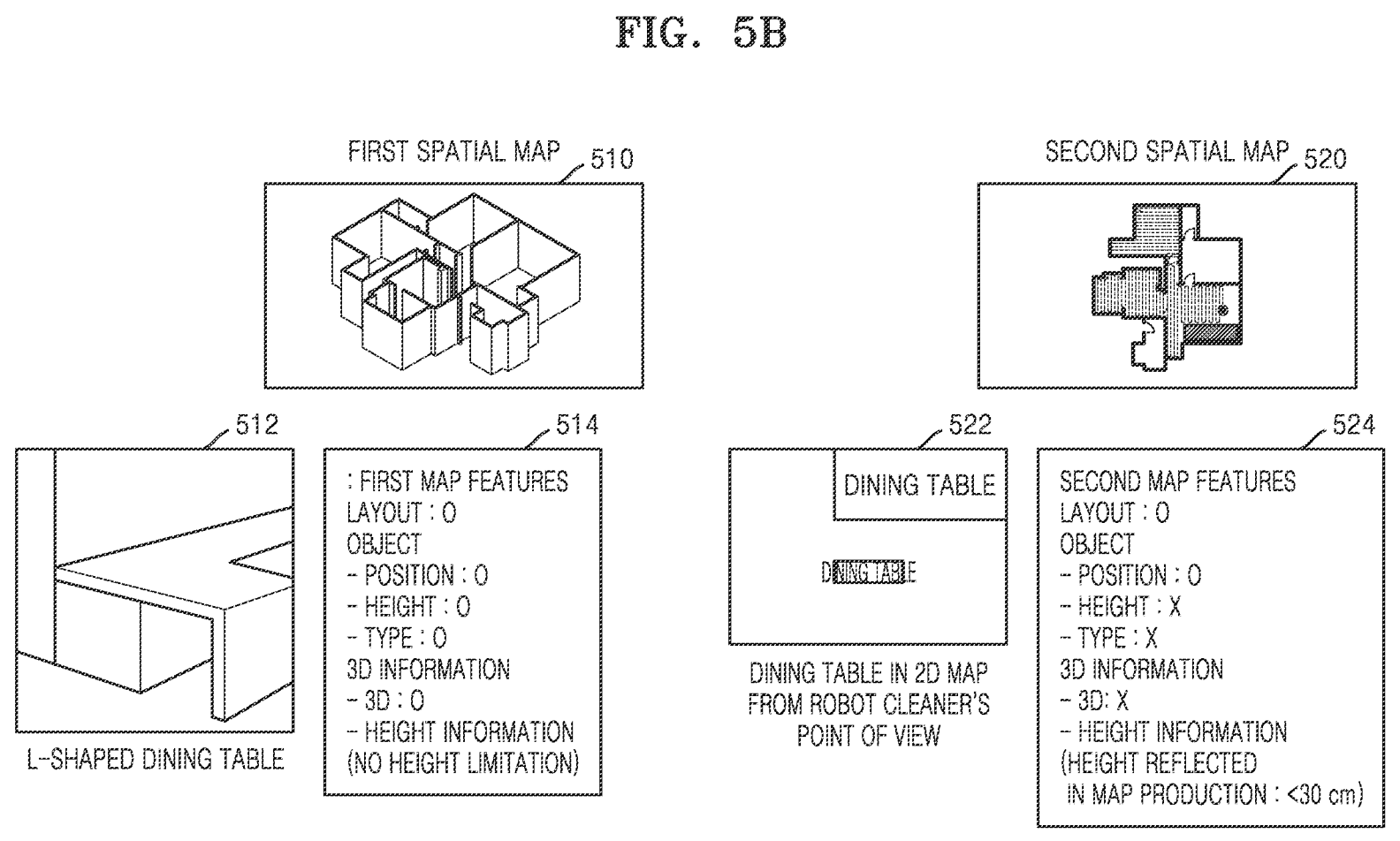

FIRST SPATIAL MAP  510

514

: FIRST MAP FEATURES
LAYOUT : O
OBJECT
  - POSITION : O
  - HEIGHT : O
  - TYPE : O
3D INFORMATION
  - 3D : O
  - HEIGHT INFORMATION
    (NO HEIGHT LIMITATION)

512

L-SHAPED DINING TABLE

SECOND SPATIAL MAP  520

524

SECOND MAP FEATURES
LAYOUT : O
OBJECT
  - POSITION : O
  - HEIGHT : X
  - TYPE : X
3D INFORMATION
  - 3D : X
  - HEIGHT INFORMATION
    (HEIGHT REFLECTED
    IN MAP PRODUCTION : <30 cm)

522

DINING TABLE

DINING TABLE

DINING TABLE IN 2D MAP
FROM ROBOT CLEANER'S
POINT OF VIEW

FIRST SPATIAL MAP (610)

SECOND SPATIAL MAP (620)

Figure 7A:
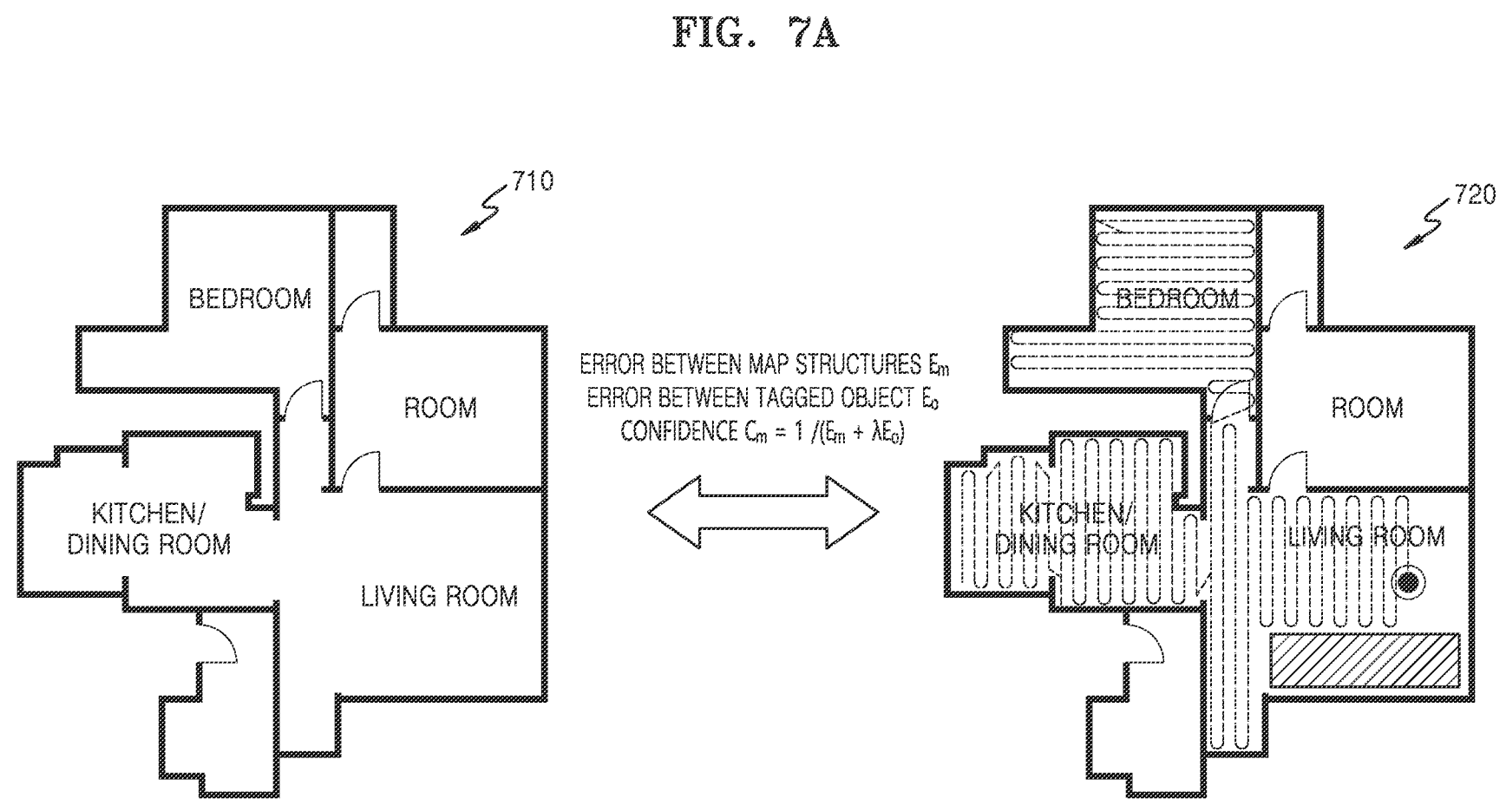

BEDROOM

ROOM

LIVING ROOM

KITCHEN/
DINING ROOM

720

BEDROOM

ROOM

LIVING ROOM

KITCHEN/
DINING ROOM

ERROR BETWEEN MAP STRUCTURES $E_m$
ERROR BETWEEN TAGGED OBJECT $E_o$
CONFIDENCE $C_m = 1 / (E_m + \lambda E_o)$

S330

S340

S710

CALCULATE CONFIDENCE SCORE
REPRESENTING SIMILARITY BETWEEN EACH
OF FIRST MAP FEATURES IN FIRST SPATIAL
MAP AND EACH OF SECOND MAP FEATURES
IN SECOND SPATIAL MAP CORRESPONDING
TO EACH OF FIRST MAP FEATURES

S720

REMOVE MAP FEATURES WHOSE
CONFIDENCE SCORES ARE LESS THAN
THRESHOLD FROM AMONG FIRST MAP
FEATURES AND SECOND MAP FEATURES

S350

FIG. 7C
FIRST SPATIAL MAP 710
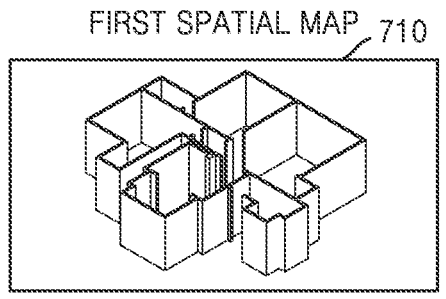
SECOND SPATIAL MAP 720
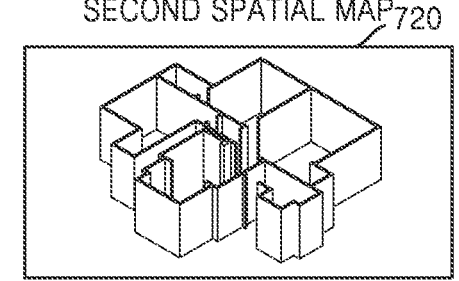
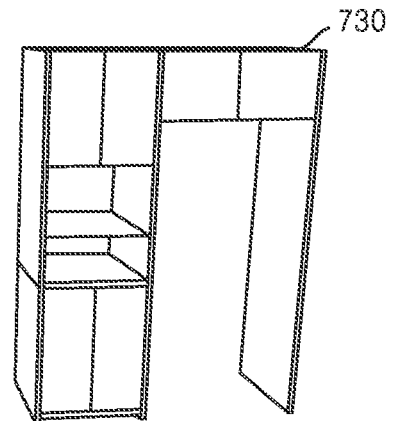
730
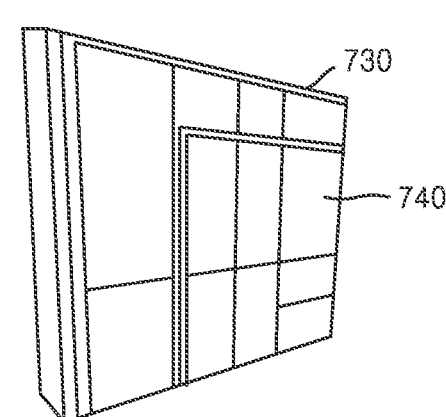
730
740

Figure 8B:
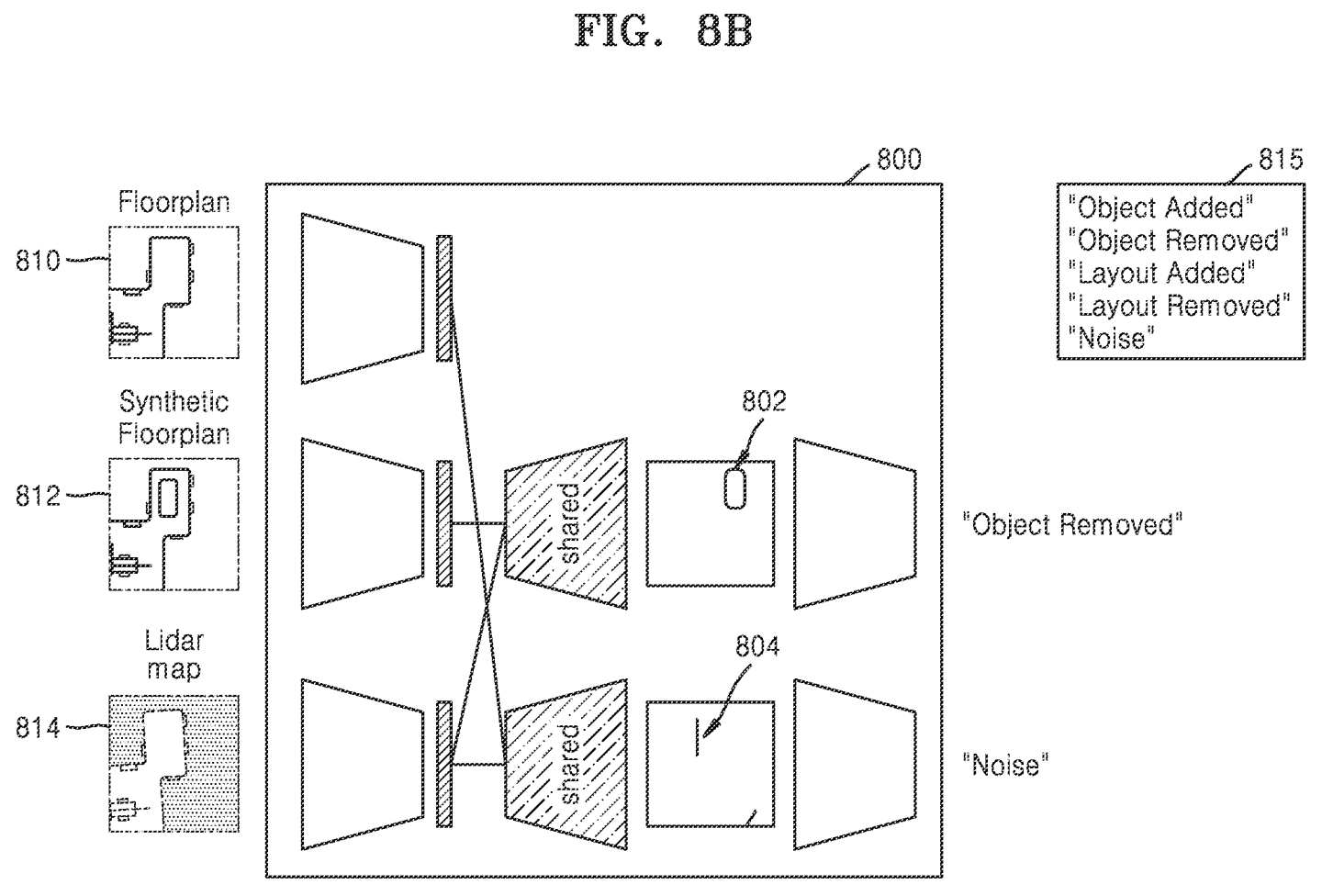

"Object Added"
"Object Removed"
"Layout Added"
"Layout Removed"
"Noise"

"Object Removed"

"Noise"

800

802

804 shared shared

Floorplan

810

Synthetic
Floorplan

812

Lidar
map

814

FIG. 9C
940
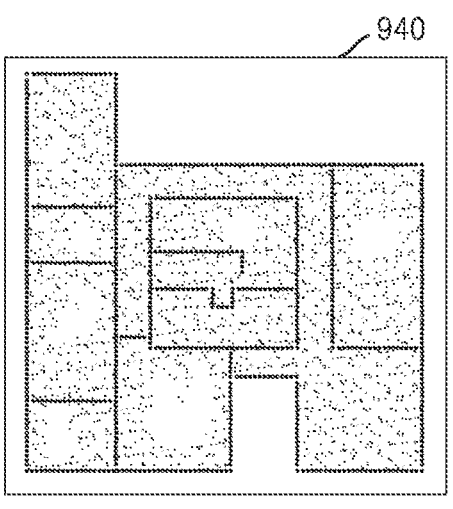
950
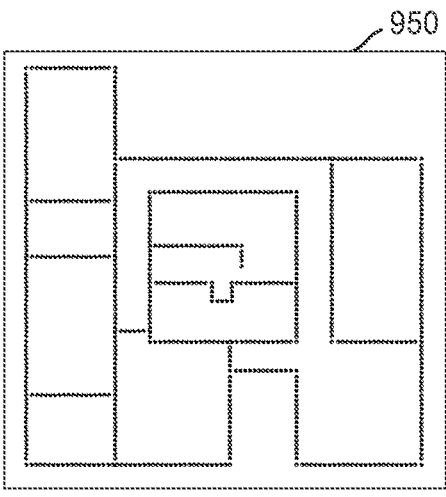

FIG. 10

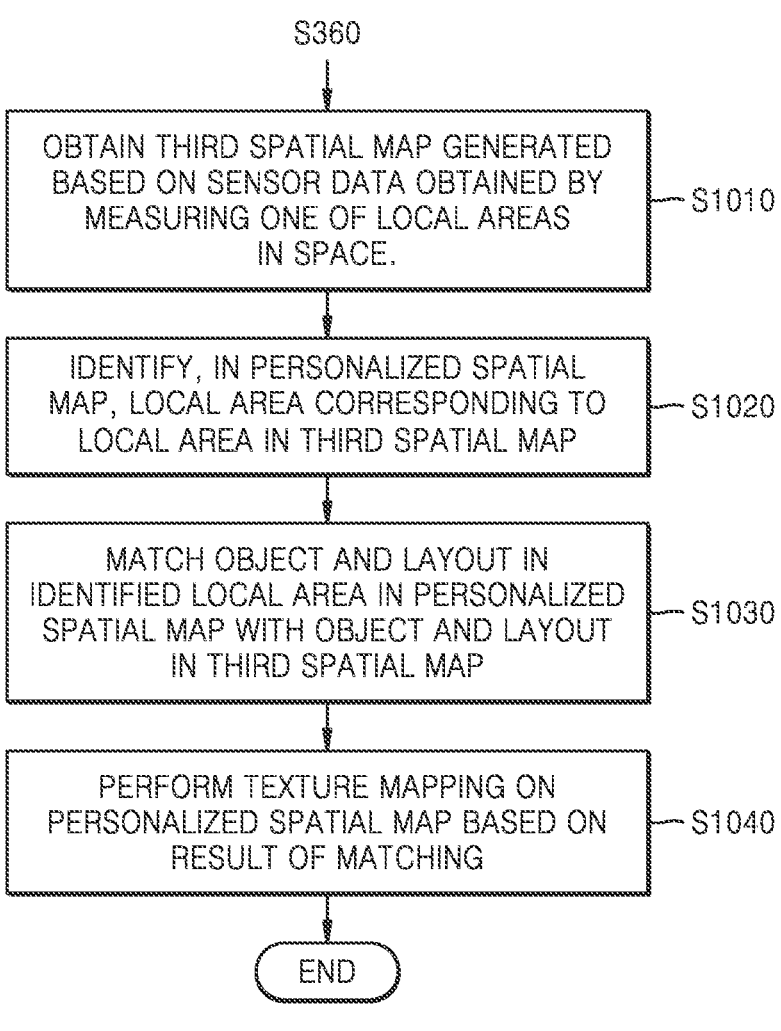

S360

OBTAIN THIRD SPATIAL MAP GENERATED
BASED ON SENSOR DATA OBTAINED BY
MEASURING ONE OF LOCAL AREAS
IN SPACE. — S1010

IDENTIFY, IN PERSONALIZED SPATIAL
MAP, LOCAL AREA CORRESPONDING TO
LOCAL AREA IN THIRD SPATIAL MAP — S1020

MATCH OBJECT AND LAYOUT IN
IDENTIFIED LOCAL AREA IN PERSONALIZED
SPATIAL MAP WITH OBJECT AND LAYOUT
IN THIRD SPATIAL MAP — S1030

PERFORM TEXTURE MAPPING ON
PERSONALIZED SPATIAL MAP BASED ON
RESULT OF MATCHING — S1040

END

FIG. 11B

METHOD AND SERVER FOR GENERATING SPATIAL MAP

CROSS-REFERENCE TO RELATED APPLICATIONS

This application is a bypass continuation of International Application No. PCT/KR2023/013661, filed on Sep. 12, 2023, which is based on and claims priority to Korean Patent Application Nos. 10-2022-0129041, filed on Oct. 7, 2022, and 10-2022-0174950, filed on Dec. 14, 2022, the disclosures of which are incorporated by reference herein in their entireties.

BACKGROUND

1. Field

The disclosure relates to a server and an operation method thereof for providing a spatial map including spatial information optimized for a user by using a map analysis algorithm.

2. Description of Related Art

Various technologies/techniques have been developed to represent a user's space as a virtual space by using virtual reality (VR), augmented reality (AR), computer graphics, etc. A virtual space implemented to create an immersive feeling may be used in various ways, such as real estate sales and interior design for home appliances and furniture.

As an example for providing an immersive virtual space corresponding to the user's space, a spatial map may be used. In this case, a plurality of spatial maps corresponding to the user's space are available. For example, there may be a public spatial map corresponding to the user's space, but this spatial map does not include detailed changes in the user's real-world space. That is, there are limitations in reflecting the user's real-world space as it is because spatial information included in the spatial map differs depending on when the spatial map is generated, etc.

To address the above disadvantages, spatial map generation/updating algorithms may be used to reflect personal spatial information such as an actual layout of a user's space and real-world objects, etc.

SUMMARY

According to an aspect of the disclosure, a method, performed by a server, of providing a personalized spatial map, includes: obtaining a first spatial map including first map features representing spatial information about a space; obtaining a second spatial map based on sensor data obtained by measuring the space, the second spatial map including second map features; identifying third map features for map alignment from among the first map features and the second map features; aligning the first spatial map and the second spatial map, based on the identified third map features; identifying local areas in the space where at least one difference exists between the first spatial map and the second spatial map; and generating the personalized spatial map by identifying pieces of spatial information about the local areas based on the second map features.

The map features including the first map features and the second map features may include at least one of spatial layout information, information related to an object in the space, or spatial three-dimensional (3D) information.

The method may include, based on a spatial dimension of the first spatial map being different from a spatial dimension of the second spatial map, projecting a higher dimensional spatial map among the first spatial map and the second spatial map to correspond to a spatial dimension of a lower dimensional spatial map.

The identifying of the third map features for the map alignment may include: tagging the first map features and the second map features with pieces of feature attribute information, and wherein the aligning of the first spatial map and the second spatial map may include: aligning the first spatial map and the second spatial map such that the first spatial map and the second spatial map overlap based on the tagged first map features and the tagged second map features.

The aligning of the first spatial map and the second spatial map may include: identifying a confidence score representing a similarity between each of the first map features in the first spatial map and each of the second map features in the second spatial map corresponding to each of the first map features; and removing fourth map features that have confidence scores less than a predetermined threshold from among the first map features and the second map features.

The identifying of the local areas in the space where the at least one difference exists between the first spatial map and the second spatial map may include: comparing the first spatial map with the second spatial map; and classifying local areas changed in the second spatial map relative to the first spatial map, and wherein the generating of the personalized spatial map may include: generating the personalized spatial map by identifying pieces of spatial information about the local areas, based on the second map features and the classified local areas.

The changed local areas may be classified into at least one of a local area where an object is changed or a local area containing measurement noise.

The identifying of the local areas in the space where the at least one difference exists between the first spatial map and the second spatial map may include identifying the local areas by using a spatial change detection model that takes the first spatial map and the second spatial map as an input and outputs information about the local areas.

The method may include obtaining a 3D spatial map of at least one local area among a plurality of local areas in the space; and updating, based on fifth map features in the 3D spatial map, spatial information about the at least one local area within the personalized spatial map.

The method may include generating, based on the personalized spatial map, a personalized virtual space corresponding to the personalized spatial map.

According to an aspect of the disclosure, a server for providing a personalized spatial map includes: a communication interface; at least one memory configured to store one or more instructions; and at least one processor configured to execute the one or more instructions stored in the at least one memory to: obtain, via the communication interface, a first spatial map including first map features representing spatial information about a space, obtain, via the communication interface, a second spatial map based on sensor data obtained by measuring the space, the second spatial map including second map features, identify third map features for map alignment from among the first map features and the second map features, align the first spatial map and the second spatial map based on the identified third map features, identify local areas in the space where at least one difference exists between the first spatial map and the second spatial map, and generate the personalized spatial map by identifying pieces of spatial information about the local areas based on the second map features.

The map features including the first map features and the second map features may include at least one of spatial layout information, information related to an object in the space, or spatial three-dimensional (3D) information.

The at least one processor may be further configured to execute the one or more instructions to, based on a spatial dimension of the first spatial map being different from a spatial dimension of the second spatial map, project a higher dimensional spatial map among the first spatial map and the second spatial map to correspond to a spatial dimension of a lower dimensional spatial map.

The at least one processor may be further configured to execute the one or more instructions to: tag the first map features and the second map features with pieces of feature attribute information, and align the first spatial map and the second spatial map such that the first spatial map and the second spatial map overlap based on the tagged first map features and the tagged second map features.

The at least one processor may be further configured to execute the one or more instructions to: identify a confidence score representing a similarity between each of the first map features in the first spatial map and each of the second map features in the second spatial map corresponding to each of the first map features, and remove fourth map features that have confidence scores less than a predetermined threshold from among the first map features and the second map features.

The at least one processor may be further configured to execute the one or more instructions to: compare the first spatial map with the second spatial map, classify local areas changed in the second spatial map relative to the first spatial map, and generate the personalized spatial map by identifying pieces of spatial information about the local areas, based on the second map features and the classified local areas.

The changed local areas may be classified into at least one of a local area where an object is changed or a local area containing measurement noise.

The at least one processor may be further configured to execute the one or more instructions to identify the local areas by using a spatial change detection model that takes the first spatial map and the second spatial map as an input and output information about the local areas.

The at least one processor may be further configured to execute the one or more instructions to obtain a 3D spatial map of at least one local area among a plurality of local areas in the space, and update, based on map features in the 3D spatial map, spatial information about the at least one local area within the personalized spatial map.

The at least one processor may be further configured to execute the one or more instructions to generate, based on the personalized spatial map, a personalized virtual space corresponding to the personalized spatial map.

According to an aspect of the disclosure, a non-transitory computer-readable recording medium has recorded thereon a program for providing a personalized spatial map by executing a method that includes: obtaining a first spatial map including first map features representing spatial information about a space; obtaining a second spatial map based on sensor data obtained by measuring the space, the second spatial map including second map features; identifying third map features for map alignment from among the first map features and the second map features; aligning the first spatial map and the second spatial map, based on the identified third map features; identifying local areas in the space where at least one difference exists between the first spatial map and the second spatial map; and generating the personalized spatial map by identifying pieces of spatial information about the local areas based on the second map features.

According to an aspect of the disclosure, an electronic device for providing a personalized spatial map includes: at least one memory configured to store one or more instructions; and at least one processor configured to execute the one or more instructions stored in the at least one memory to: obtain a first spatial map including first map features representing spatial information about a space, obtain a second spatial map based on sensor data obtained by measuring the space, the second spatial map including second map features, identify third map features for map alignment from among the first map features and the second map features, align the first spatial map and the second spatial map based on the identified third map features, identify local areas in the space where at least one difference exists between the first spatial map and the second spatial map, and generate the personalized spatial map by identifying pieces of spatial information about the local areas based on the second map features.

The map features including the first map features and the second map features may include at least one of spatial layout information, information related to an object in the space, or spatial three-dimensional (3D) information.

The at least one processor may be further configured to execute the one or more instructions to, based on a spatial dimension of the first spatial map being different from a spatial dimension of the second spatial map, project a higher dimensional spatial map among the first spatial map and the second spatial map to correspond to a spatial dimension of a lower dimensional spatial map.

The at least one processor may be further configured to execute the one or more instructions to: tag the first map features and the second map features with pieces of feature attribute information, and align the first spatial map and the second spatial map such that the first spatial map and the second spatial map overlap based on the tagged first map features and the tagged second map features.

BRIEF DESCRIPTION OF THE DRAWINGS

The above and other aspects, features, and advantages of embodiments of the disclosure will be more apparent from the following description taken in conjunction with the accompanying drawings, in which:

FIG. 1 illustrates an example in which a server provides a personalized spatial map, according to an embodiment of the disclosure;

FIG. 4 is a diagram illustrating map features in a spatial map, according to an embodiment of the disclosure;

FIG. 5B is a diagram illustrating an operation in which a server projects a spatial map, according to an embodiment of the disclosure;

FIG. 7A is a diagram illustrating an operation in which a server evaluates a confidence for aligned maps, according to an embodiment of the disclosure;

FIG. 7C is a diagram illustrating an example in which a server determines a confidence for aligned maps, according to an embodiment of the disclosure;

FIG. 8B is a diagram illustrating an artificial intelligence (AI) model used by a server, according to an embodiment of the disclosure;

FIG. 9C is a diagram illustrating an example in which a server generates a personalized spatial map, according to an embodiment of the disclosure;

FIG. 10 is a flowchart illustrating an operation in which a server updates a local area in a personalized spatial map, according to an embodiment of the disclosure;

FIG. 11B is a diagram illustrating an operation in which a server provides a virtual space based on a personalized spatial map, according to an embodiment of the disclosure;

DETAILED DESCRIPTION

Figure 2A:
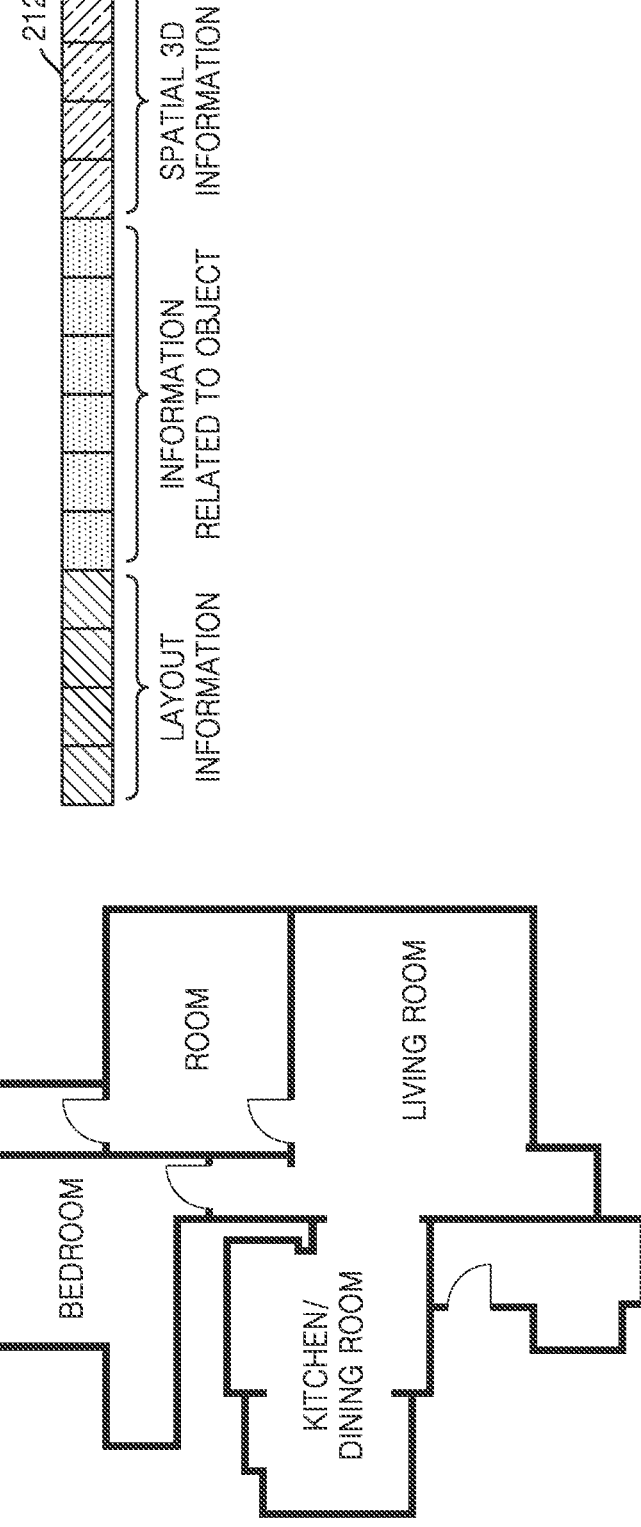
FIG. 2A is a diagram illustrating a first spatial map used by a server, according to an embodiment of the disclosure.

Throughout the disclosure, the expression "at least one of a, b or c" indicates only a, only b, only c, both a and b, both a and c, both b and c, or all of a, b, and c.

The terms used in the disclosure may be general terms currently widely used in the art based on functions described in the disclosure, but may be changed according to an intention of a technician engaged in the art, precedent cases, advent of new technologies, etc. Furthermore, some particular terms may be arbitrarily selected by the applicant, and the meaning of the selected terms will be described in detail in the detailed description of the disclosure. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art. Furthermore, although the terms including an ordinal number such as "first", "second", etc. may be used herein to describe various elements or components, these elements or components should not be limited by the terms. The terms are only used to distinguish one element or component from another element or component.

Throughout the specification, when a part "includes" or "comprises" an element, unless there is a particular description contrary thereto, it is understood that the part may further include other elements, not excluding the other elements. In addition, terms such as "portion", "module", etc., described in the specification refer to a unit for processing at least one function or operation and may be implemented as hardware or software, or a combination of hardware and software.

Embodiments of the disclosure will be described more fully hereinafter with reference to the accompanying drawings so that they may be easily implemented by one of ordinary skill in the art. However, the disclosure may be implemented in different forms and should not be construed as being limited to embodiments thereof set forth herein. Furthermore, parts not related to descriptions of the disclosure are omitted to clearly explain the disclosure in the drawings, and like reference numerals denote like elements throughout. In addition, reference numerals used in each drawing are only for describing each drawing, and different reference numerals used in different drawings are not intended to indicate different elements. Hereinafter, the disclosure will be described in detail with reference to the accompanying drawings.

Figure 1:
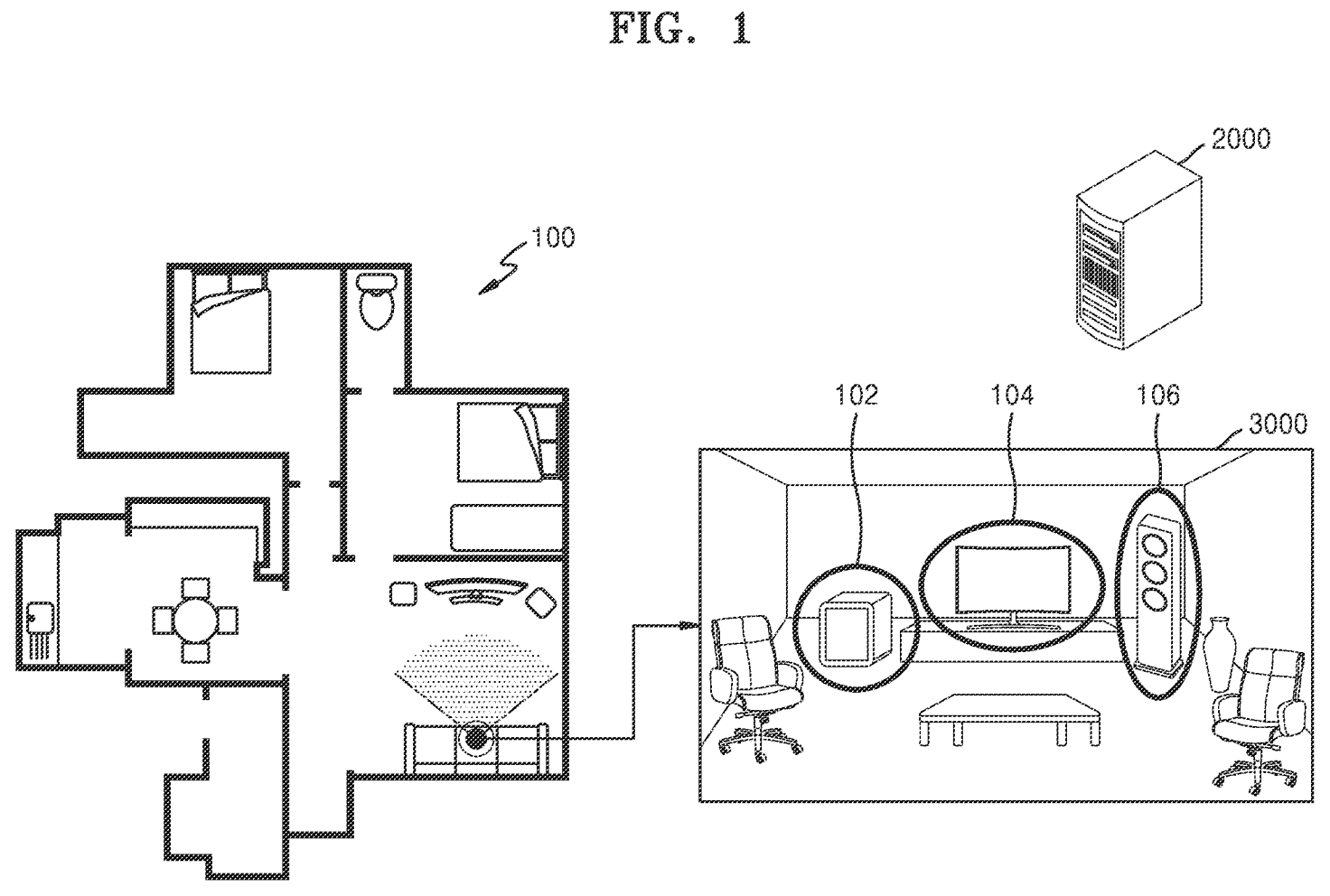

FIG. 1 schematically illustrates an example in which a server provides a personalized spatial map, according to an embodiment of the disclosure.

In the disclosure, a 'user' refers to a user who receives and uses a personalized spatial map 100 generated by a server 2000.

In the disclosure, a 'spatial map' refers to map data on an interior space, and may provide a location, direction, navigation, search, etc. of the indoor space. The spatial map may consist of a hierarchical structure of pieces data for representing indoor spatial information, and various known indoor map data formats may be used. Data representing attributes of spatial information included in the spatial map may be referred to as map features. Map features define various attributes that may represent indoor spatial information, such as spatial layout information, information related to an object in a space, spatial three-dimensional (3D) information, and other spatial map related information (e.g., a building address and floors). The map features in the spatial map may be input by a map maker, or may be input or updated based on sensor data obtained by measuring the indoor space. The spatial map may be provided to the user in various forms. For example, the spatial map may be provided to the user in the form of a floorplan, and the indoor space may be rendered in the form of a 360 degree panoramic view based on the spatial map and provided to the user.

In an embodiment of the disclosure, the server 2000 may generate and provide a personalized spatial map 100 to the user. The personalized spatial map 100 may be generated based on personalized spatial information such as layout information and object information in a user's space. In other words, the personalized spatial map 100 may be a representation of a user's real-world space as map data.

In an embodiment of the disclosure, the user may be provided with the personalized spatial map 100 via a user's electronic device 3000. The user's electronic device 3000 may be a device including a display. For example, the user's electronic device 3000 may include, but is not limited to, a smartphone, a head-mounted display (HMD) (e.g., an augmented reality (AR)/virtual reality (VR) device), a smart TV, a tablet PC, and a laptop computer, etc. The user's electronic device 3000 may be implemented as a device (e.g., a desktop computer) separate from a display and connectable to a display device (e.g., a monitor). The server 2000 may transmit the personalized spatial map 100 to the user's electronic device 3000.

In an embodiment of the disclosure, the user may be provided with a virtual space generated based on the personalized spatial map 100 via the user's electronic device 3000. Because the virtual space generated based on the personalized spatial map 100 is an implementation of the user's real-world space as a virtual environment, objects existing in the user's space (e.g., an air purifier 102, a TV 104, an air conditioner 106, etc.) may be included in the virtual space. The user may perform various virtual space experience activities, such as changing the placement of objects in the virtual space and appreciating the virtual space. The server 2000 may transmit virtual spatial data to the user's electronic device 3000. Alternatively, the user's electronic device 3000 may generate virtual spatial data may be generated based on the personalized spatial map 100.

In an embodiment of the disclosure, the server 2000 may obtain various types of spatial maps corresponding to the space. For example, the server 2000 may obtain a public spatial map known on the Internet or the like, obtain a spatial map captured/generated by the user, or obtain a spatial map generated by another electronic device of the user (e.g., a robot cleaner, etc.). For the above-described various types of spatial maps, the accuracy of the spatial maps may decrease depending on the method of obtaining them, or the spatial maps may not match spatial information about the user's real-world space depending on the time when the spatial maps are generated. The server 2000 may generate the personalized spatial map 100 by obtaining different spatial maps of various types and fusing and updating the spatial maps.

Moreover, although it has been exemplarily described in the disclosure that the server 2000 generates the personalized spatial map 100, the operations of the disclosure may be performed by other electronic devices. For example, the operations of the disclosure may be performed by the user's electronic device 3000 including the display and by another electronic device of the user (e.g., a robot cleaner, etc.).

Specific operations in which the server 2000 generates and provides the personalized spatial map 100 are described in more detail in the description with reference to the following drawings.

FIG. 2A is a diagram illustrating a first spatial map used by a server, according to an embodiment of the disclosure.

In an embodiment of the disclosure, a first spatial map 210 may be map data including various pieces of information related to a space. The first spatial map 210 may include, for example, a two-dimensional (2D)/3D spatial map, a 2D/3D floorplan, and a blueprint, but is not limited thereto, and the first spatial map 210 may be various forms of map data including 2D/3D spatial information. One or more first spatial maps 210 may be generated.

The first spatial map 210 may be a pre-generated spatial map. The first spatial map 210 may be map data corresponding to a user's space, but is a spatial map generated at a time point in the past. Thus, the first spatial map 210 may be a spatial map in which objects existing in a user's real-world space, a history of changes to a layout of the space, etc. are not reflected.

The first spatial map 210 may be, for example, a pre-generated spatial map produced by a third party. For example, the third party may include, but is not limited to, a map production company, a real estate transaction brokerage firm, an interior design firm, a furniture/home appliance sales company, a personal map maker, etc. When the third party produces and distributes spatial maps so that they are made publicly available, the server 2000 may obtain a public spatial map corresponding to the user's space as the first spatial map 210 among public spatial maps provided by the third party.

The first spatial map 210 may be, for example, a spatial map pre-generated by the user. The user may create a spatial map corresponding to the user's space by using his or her electronic device. In detail, the user may capture an image of the space via an electronic device (e.g., a smartphone, etc.) including a camera to produce a spatial map based on the captured image of the space, or produce a spatial map by using an electronic device (e.g., a desktop, a laptop, etc.) on which a spatial mapping tool (e.g., a program, an application, etc.) is executable. The spatial map produced by the user may be stored in the server 2000, and the server 2000 may obtain the spatial map produced by the user as the first spatial map 210.

The first spatial map 210 may be, for example, a spatial map pre-generated by an electronic device (e.g., an indoor robot, a robot cleaner, an Internet Protocol (IP) camera, or the like) operating within the user's space. In detail, a spatial map generated by scanning the space using one or more sensors while an indoor robot, a robot cleaner, or the like moves through the space may be stored in the server 2000. Alternatively, a spatial map generated based on an image of the space captured by an IP camera may be stored in the server 2000. The server 2000 may obtain, as the first spatial map 210, a spatial map generated by an electronic device operating in the user's space.

The first spatial map 210 may include spatial information. The spatial information may consist of map features (hereinafter, referred to as first map features 212) that are data representing specific attributes of the space. The first map features 212 may include, but are not limited to, spatial layout information, information related to an object in the space, spatial 3D information, and other spatial map related information.

The spatial layout information may include, for example, locations and sizes of walls, columns, aisles, doors, and windows, etc. in the space, but is not limited thereto.

The information related to an object in the space may include, for example, but is not limited to, a position of the object in the space, a size of the object in the space, a type of the object, identification information about the object, an orientation of the object, etc.

The spatial 3D information may include, for example, but is not limited to, information on whether the spatial map is 2D/3D, a width, a length, and a height of the space, height information reflected when producing the spatial map, etc.

The information related to the spatial map may include, for example, identification information about the spatial map, an update time of the spatial map, but is not limited thereto.

Specific values of the first map features 212, i. e., attribute information on features, may already be included in the first spatial map 210 or may be tagged by the server 2000.

In other words, the first spatial map 210 may be a spatial map that includes basic and general spatial information about the user's space but does not include personalized spatial information. When the server 2000 generates a personalized spatial map representing spatial information about the user's real-world space, the first spatial map 210 may be used as a base spatial map.

Figure 2B:
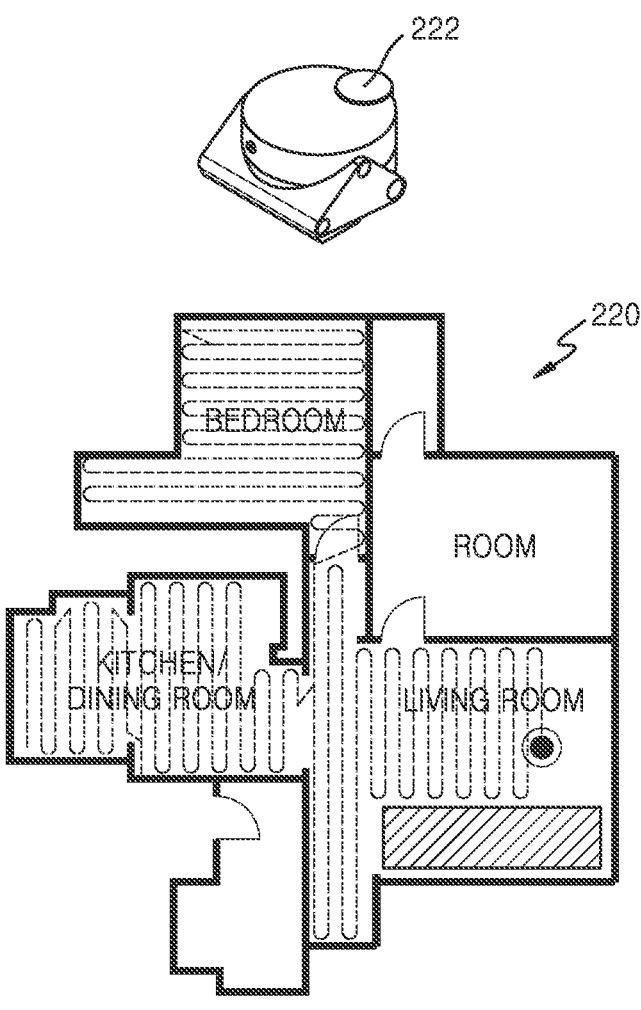
FIG. 2B is a diagram illustrating a second spatial map used by a server, according to an embodiment of the disclosure.

FIG. 2B is a diagram illustrating a second spatial map used by a server, according to an embodiment of the disclosure.

In an embodiment of the disclosure, a second spatial map 220 may be another map data including various pieces of information related to the space. The second spatial map 220 may include, for example, a 2D/3D spatial map, an occupancy grid map, etc., but is not limited thereto. The second spatial map 220 may be generated after the time at which the first spatial map 210 is generated. One or more second spatial maps 220 may be generated.

In an embodiment of the disclosure, the second spatial map 220 may be a spatial map generated based on sensor data obtained by measuring the space. The sensor data may be obtained using one or more sensors capable of measuring the space. The one or more sensors may be, for example, but are not limited to, a red, green, blue (RGB) sensor, an RGB-Depth (RGB-D) sensor, a time-of-flight (ToF) sensor, a light detection and ranging (lidar) sensor, a radio detection and ranging (radar) sensor, etc. In addition, the one or more sensors may be mounted on an indoor robot, a robot cleaner, a user's smartphone, etc.

The second spatial map 220 may be a spatial map in which objects existing in a user's real-world space, a history of changes to a layout of the space, etc. are reflected. However, because the second spatial map 210 is generated based on sensor data obtained by measuring the space, in some cases, spatial information based on the sensor data may include only spatial information for a local area, rather than spatial information for the entire area (global area) of the space. The global area and the local area are relative concepts, and the local area may be a part of the global area. For example, when sensor data is obtained by measuring all areas in the space, all or part of spatial information in the second spatial map 210 may reflect information from the sensor data. For example, when sensor data is obtained by measuring only some areas in the space, only spatial information corresponding to the measured areas among pieces of the spatial information in the second spatial map 210 may reflect information from the sensor data. Also, the second spatial map 210 may be a spatial map including measurement noise occurring when obtaining sensor data. Noise includes all noise that may occur due to various causes, such as sensor measurement errors, the presence of temporary obstacles, environmental factors (illumination, light reflection, etc.) in the space, etc.

The server 2000 may obtain the second spatial map 220 generated by an electronic device including one or more sensors. Alternatively, the server 2000 may obtain sensor data from an electronic device including one or more sensors and generate the second spatial map 220.

The second spatial map 220 may include spatial information. The spatial information may consist of map features (hereinafter, referred to as second map features) that are data representing specific attributes of the space. The second map features may include, but are not limited to, spatial layout information, information related to an object in the space, and spatial 3D information. Elements of the second map features may respectively correspond to elements of the first map features 212, and because the second map features differ from the first map features 212 only in terms of feature values or the presence or absence of the feature values, descriptions already provided above are omitted for brevity. Specific values of the second map features, i.e., attribute information about features, may already be included in the second spatial map 220 or tagged by the server 2000.

That is, the second spatial map 220 may be a spatial map including personalized spatial information about the user's space (e.g., objects present in the space, a current spatial layout, etc.). When the server 2000 generates a personalized spatial map representing spatial information about the user's real-world space, the pieces of the spatial information in the second spatial map 220 may be updated in the personalized spatial map by using the first spatial map 210 as a base map.

Moreover, among the first spatial maps 210 described with reference to FIG. 2A, a spatial map pre-generated by the user or a spatial map pre-generated by an electronic device operating in the user's space is also a spatial map generated based on sensor data, but is distinguished from the second spatial map 220 described with reference to FIG. 2B.

For example, even a spatial map generated based on sensor data may be classified as the first spatial map 210 when a predetermined time period has elapsed from the time of generation of the spatial map. Alternatively, when a spatial map generated based on the sensor data includes map features (e.g., accurate layout information regarding the entire space, etc.) satisfying predetermined criteria, which are sufficient to serve as a base for a personalized spatial map, the spatial map may be classified as the first spatial map 210.

Figure 2C:
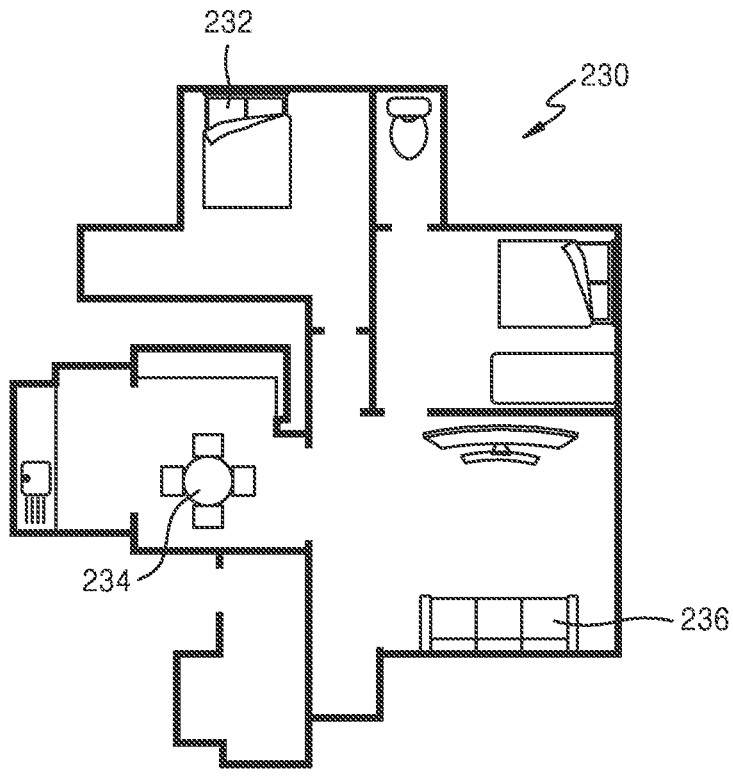
FIG. 2C is a diagram illustrating a personalized spatial map generated by a server, according to an embodiment of the disclosure.

FIG. 2C is a diagram illustrating a personalized spatial map generated by a server, according to an embodiment of the disclosure.

According to an embodiment of the disclosure, the server 2000 may generate a personalized spatial map 230, based on the first spatial map 210 and the second spatial map 220. The personalized spatial map 230 may be, for example, a 2D spatial map or a 3D spatial map, but is not limited thereto.

The personalized spatial map 230 may include information about the user's space. The information about the user's space may consist of map features that are data representing specific attributes of the user's space. The map features in the personalized spatial map 230 may include, for example, but are not limited to, spatial layout information, information related to an object in the space, and spatial 3D information.

In detail, the spatial layout information in the personalized spatial map 230 may indicate an updated spatial layout of the user's space. Updating the spatial layout may include, but are not limited to, removing walls, adding walls, etc.

The information related to an object in the space, which is contained in the personalized spatial map 230, may indicate objects existing in the user's space. For example, information related to objects, such as a bed 232, a dining table 234, and a sofa 236 present in the user's space, may include, but is not limited to, a position of each object in the space, a size of each object in the space, a type of each object, identification information about each object, an orientation of each object, etc.

The spatial 3D information in the personalized spatial map 230 may include, but is not limited to, information about whether the personalized spatial map 230 is 2D/3D, a width, a height, a height of the user's space, height information reflected when producing the personalized spatial map 230, etc.

In other words, the personalized spatial map 230 may be a spatial map including general spatial information including information related to the spatial layout of the user's space, etc., and personalized spatial information such as an object existing in the user's space, a changed layout, etc.

Specific operations in which the server 2000 uses the first spatial map 210 and the second spatial map 220 to apply various map update algorithms and generate and provide the personalized spatial map 230 are described in more detail in the description with reference to the following drawings.

Figure 3:
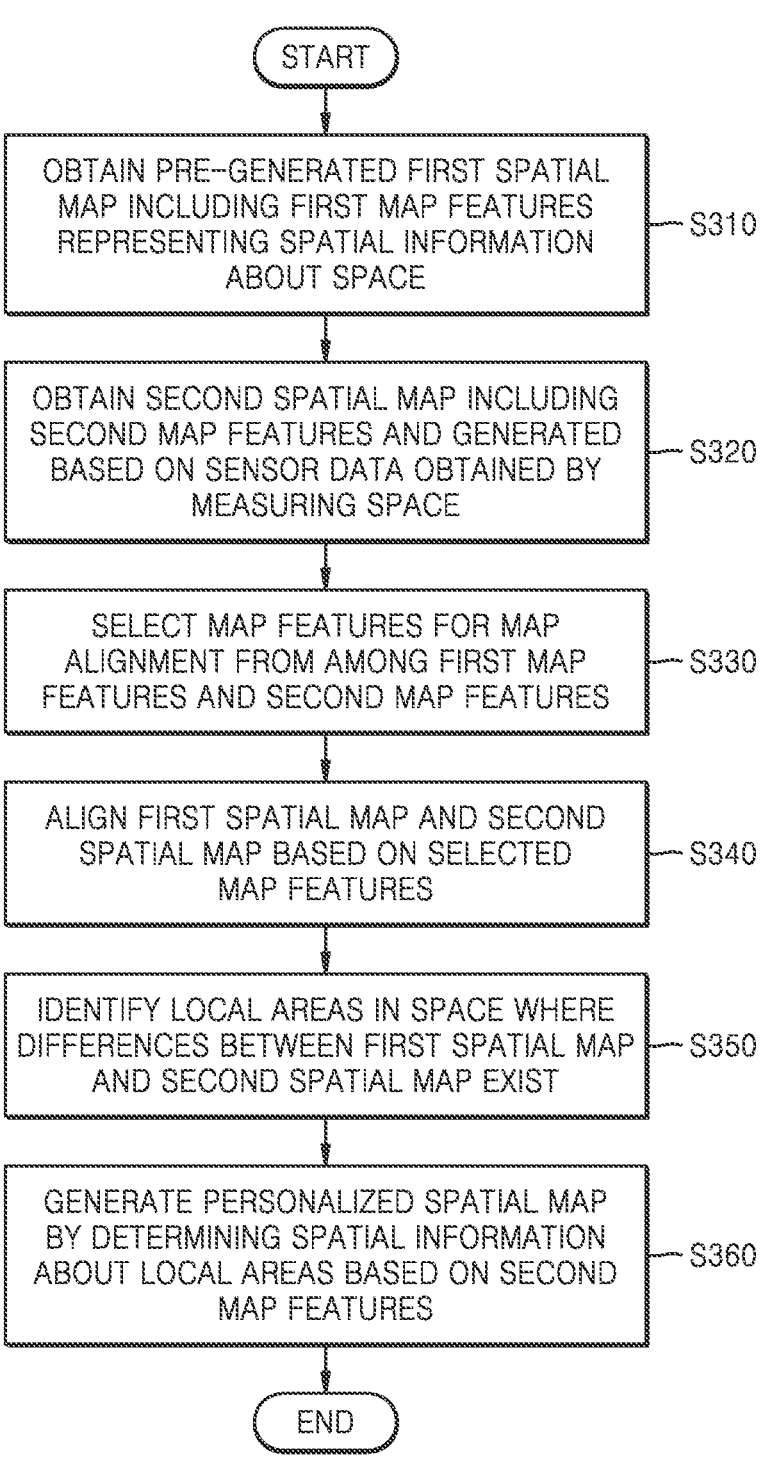
FIG. 3 is a flowchart illustrating an operation in which a server generates a personalized spatial map, according to an embodiment of the disclosure.

FIG. 3 is a flowchart illustrating an operation in which a server generates a personalized spatial map, according to an embodiment of the disclosure.

In operation S310, the server 2000 obtains a pre-generated first spatial map including first map features representing spatial information about a space. The server 2000 may obtain a pre-generated first spatial map from a map database stored on the server 2000, or obtain a pre-generated first spatial map from another electronic device outside the server 2000. The first spatial map may be a spatial map that includes basic and general spatial information about the user's space but does not include personalized spatial information. Because the first spatial map has been described above with reference to FIG. 2A, descriptions already provided above are omitted for brevity.

In operation S320, the server 2000 obtains a second spatial map including second map features and generated based on sensor data obtained by measuring the space. The server 2000 may obtain a second spatial map from a map database stored on the server 2000, or obtain a second spatial map from another electronic device outside the server 2000. The second spatial map is generated by measuring the user's space with one or more sensors, and may be a spatial map including personalized spatial information about the user's space (e.g., objects present in the space, current spatial layout, etc.). Because the second spatial map has been described above with reference to FIG. 2B, descriptions already provided above are omitted for brevity.

In operation S330, the server 2000 selects map features for map alignment from among the first map features and the second map features.

The first spatial map may include the first map features, and the second spatial map may include the second map features. The server 2000 may select common feature elements from among the first map features and the second map features.

The server 2000 may tag pieces of feature attribute information onto features (e.g., a spatial layout, an object, etc.) that may be used for map alignment. For example, the server 2000 may tag attribute information about an object onto features corresponding to the object from among the first map features, and tag the attribute information about the object onto features corresponding to the object from among the second map features. In detail, the server 2000 may tag a position of the object, a size of the object in the space, a type of the object, identification information about the object, an orientation of the object, etc. onto features corresponding to the object, but is not limited thereto. In the same manner, the server 2000 the server 2000 may tag pieces of attribute information indicating spatial layout information, information related to an object in the space, spatial 3D information, and other spatial map related information onto the first map features and the second map features-).

Because the second spatial map is a spatial map generated based on sensor data, the second map features may include obtainment characteristics of the sensor data (e.g., obtainment time, obtainment height, etc.). Accordingly, when the server 2000 selects the second map features, the obtainment characteristics of the sensor data in the second map features may be reflected. An operation in which the server 2000 selects map features for map alignment and an example of map features in a spatial map are described in more detail in the description of FIG. 4.

In operation S340, the server 2000 aligns the first spatial map and the second spatial map based on the selected map features.

The server 2000 may align the first spatial map and the second spatial map based on pieces of attribute information tagged onto the map features. For example, the server 2000 may align a position of object a in the first spatial map with a position of the object a in the second spatial map, but is not limited thereto.

Moreover, for map alignment, various known map alignment algorithms may be further used. For example, the server 2000 may detect a minimum bounding box including feature lines (e.g., walls) and feature points (e.g., corner points) and the like in a spatial map. The server 2000 may align the first spatial map and the second spatial map by aligning feature lines and feature points in the first and second spatial maps.

In operation S350, the server 2000 identifies local areas in the space where differences exist between the first spatial map and the second spatial map.

The server 2000 may identify, based on the pre-generated first spatial map, changed local areas in the second spatial map generated based on sensor data, and classify types of changes in the local areas. For example, the server 2000 may classify a changed local area as a local area where an object is changed, a local area with a changed spatial layout, a local area containing measurement noise from a sensor, or the like, but the classification is not limited thereto.

For example, when the entire area (global area) of the space is a 'house', local areas may be 'room', 'bedroom', 'living room', 'kitchen', etc. The server 2000 may identify whether the 'room', 'bedroom', 'living room', 'kitchen', etc. are areas whose spatial information is changed (e.g., areas where a layout change, an object change, noise, etc. occurs).

In operation S360, the server 2000 generates a personalized spatial map by determining pieces of spatial information about the local areas based on the second map features.

When a local area having a difference between the first spatial map and the second spatial map is identified, the server 2000 may determine spatial information based on the second map features in the second spatial map. For example, when it is identified that there is a change in an object in the space, the server 2000 may include the object from the second spatial map in the personalized spatial map 230. For example, when it is identified that there is a change in a spatial layout within the space, the server 2000 may include the spatial layout for the second spatial map in the personalized spatial map 230. For example, when it is identified that the second spatial map includes noise, the server 2000 may remove the noise so that the noise in the second spatial map is not included in the personalized spatial map 230.

According to an embodiment of the disclosure, the server 2000 may generate the personalized spatial map 230 including personalized spatial information by updating pieces of spatial information about the local areas based on the second map features.

FIG. 4 is a diagram illustrating map features in a spatial map of the disclosure.

In an embodiment of the disclosure, a first spatial map 410 may include first map features 412, and the second spatial map 420 may include second map features 422. The first map features 412 and the second map features 422 may each include spatial layout information, information related to an object in a space, spatial 3D information, and other spatial map related information.

The first spatial map 410 is a pre-generated spatial map. For example, the first spatial map 410 may be a pre-generated 3D floorplan. Specific values of the first map features 412 (i.e., feature attribute information) may be values representing spatial features corresponding to the time at which the first spatial map 410 is pre-generated.

In an embodiment of the disclosure, the first spatial map 410 may include the first map features 412. For example, when the first spatial map 410 is generated, information related to a layout, an object, a 3D feature, etc. in the space may be generated to be included in the first spatial map 410. When the first spatial map 410 includes the first map features 412, the server 2000 may use the first map features 412.

In an embodiment of the disclosure, the server 2000 may extract and process information included in the first spatial map 410 to tag pieces of attribute information on the first map features 412 corresponding to the first spatial map 410. For example, based on a layout of the first spatial map 410, the server 2000 may tag information related to the layout such as walls, columns, etc. onto layout information included in the first map features 412. For example, the server 2000 may tag information such as whether the first spatial map 410 is 3D, height information, etc. onto 3D information included in the first map features 412, based on the first spatial map 410 being a spatial map including information (e.g., 3D coordinates, etc.) about the space from the floor to the ceiling. Whether the first spatial map 410 is 3D may indicate that the first spatial map 410 is a 3D spatial map, and the height information may indicate that a height within the space included in the first spatial map 410 is unlimited, but is not limited thereto. The tagged attribute information may be used for map alignment.

The second spatial map 420 is a spatial map generated based on sensor data. For example, the second spatial map 420 may be a 3D floorplan generated based on an image captured by a camera of a smartphone. Specific values of the second map features 422 (i.e., feature attribute information) may be values representing spatial features corresponding to the time at which the sensor data used to generate the second spatial map 420 is obtained.

In an embodiment of the disclosure, the server 2000 may tag pieces of attribute information in the second map features 422 corresponding to the second spatial map 420.

In an embodiment of the disclosure, the server 2000 may tag pieces of attribute information in the second map features 422 based on metadata included in the sensor data.

For example, when the second spatial map 420 is a spatial map generated using a camera (or a depth camera), an image file captured by the camera may include camera metadata. The camera metadata may include, for example, but is not limited to, date and time information, camera settings information (e.g., a focal length, flash, a rotation direction, a shooting height, etc.), depth information, etc. Based on the camera metadata, the server 2000 may tag information related to a layout, such as walls and columns, onto layout information included in the second map features 422. For example, based on the camera metadata, the server 2000 may tag information such as whether the second spatial map 420 is 3D, height information, etc. onto 3D information included in the second map features 422. Whether the second spatial map 420 is 3D may indicate that the second spatial map 420 is a 3D spatial map, and the height information may indicate that information related to a height within the space included in the second spatial map 420 is information corresponding to a height of 50 cm or more (i.e., the height reflected in map production is 50 cm or more because a camera captures images of areas at a height of 50 cm or more from the floor of the space), but is not limited thereto.

In an embodiment of the disclosure, the server 2000 may tag pieces of attribute information in the second map features 422 based on analysis of sensor data.

For example, when the second spatial map 420 is a spatial map generated using a camera (or a depth camera), the server 2000 may perform object recognition by using an image captured by the camera. The object recognition may be performed using an AI model capable of detecting/recognizing an object. Based on an object recognition result and/or camera metadata, the server 2000 may tag information such as a position of the object, a height of the object, a type of object, etc. onto object information included in the second map features 422. The tagged attribute information may be used for map alignment.

Moreover, although FIG. 4 illustrates an example in which the server 2000 uses information obtainable from a camera (or a depth camera) to tag attribute information on the second map features 422, the disclosure is not limited thereto, and any sensor data utilized in the disclosure may be used to tag attribute information on map features in the same/similar manner.

Referring to the above description of the first map features 412 and the second map features 422, even though the first spatial map 410 and the second spatial map 420 are spatial maps for the same space, pieces of specific attribute information on corresponding map features may be different depending on a method of generating the first and second spatial maps, a time point at which the first and second spatial maps are generated, etc. The map features may be used by the server 2000 to align the first spatial map 410 and the second spatial map 420, determine confidence between the first spatial map 410 and the second spatial map 420, and generate a personalized spatial map by fusing and/or updating the first spatial map 410 and the second spatial map 420. Detailed descriptions of how the map features are used are provided in the description with reference to the following drawings.

Figure 5A:
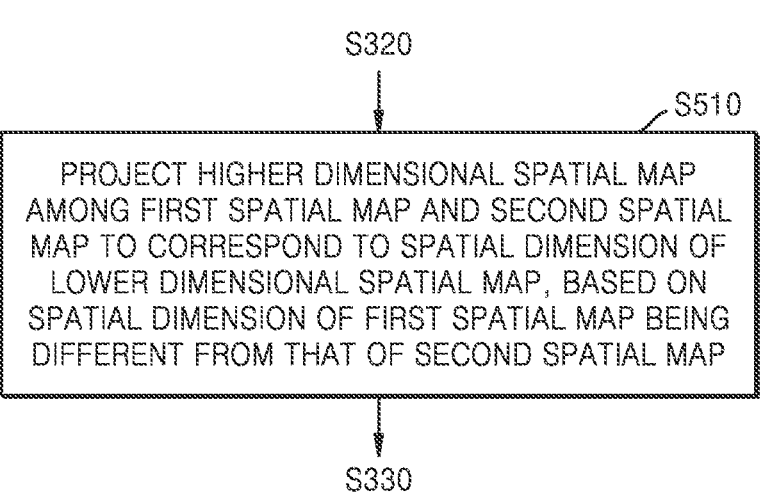
FIG. 5A is a flowchart illustrating an operation in which a server projects a spatial map, according to an embodiment of the disclosure.

FIG. 5A is a flowchart illustrating an operation in which a server projects a spatial map, according to an embodiment of the disclosure.

Operation S510 of FIG. 5A may be performed after operations S310 and S320 of FIG. 3.

In operation S510, based on a spatial dimension of the first spatial map being different from that of the second spatial map, the server 2000 projects a higher dimensional spatial map among the first spatial map and the second spatial map to correspond to a spatial dimension of the lower dimensional spatial map.

In an embodiment of the disclosure, the server 2000 may identify a spatial dimension of a spatial map. For example, the server 2000 may identify whether the spatial map is 2D or 3D based on a map feature included in the spatial map. For example, the server 2000 may identify whether the spatial map is 2D or 3D based on information (e.g., spatial coordinate information) included in the spatial map.

In an embodiment of the disclosure, when the first spatial map and the second spatial map are both 2D spatial maps or when the first spatial map and the second spatial map are both 3D spatial maps, the server 2000 may align the first and second spatial maps without separate dimensional projection. However, when the first spatial map and the second spatial map have different spatial dimensions, the server

2000 may project a higher dimensional spatial map into a lower dimension for comparison and updating between the first and second spatial maps.

For example, the first spatial map may be a 3D spatial map, and the second spatial map may be a 2D spatial map. The server 2000 may project the first spatial map into two dimensions to correspond to the spatial dimension (two dimensions) of the second spatial map.

For example, the first spatial map may be a 2D spatial map, and the second spatial map may be a 3D spatial map. The server 2000 may project the second spatial map into two dimensions to correspond to the spatial dimension (two dimensions) of the first spatial map.

In an embodiment of the disclosure, the server 2000 may tag attribute information on map features after performing projection for matching dimensions of spatial maps, as further described with reference to FIG. 5B.

FIG. 5B is a diagram illustrating an operation in which a server projects a spatial map, according to an embodiment of the disclosure.

In describing the operation of FIG. 5B, it is assumed that a first spatial map 510 is a 3D floorplan and a second spatial map 520 is a 2D occupancy grid map. However, this is merely an example, and the description with respect to FIG. 5B may be equally applied even when the first spatial map 510 is a 2D spatial map and the second spatial map 520 is a 3D spatial map.

In an embodiment of the disclosure, the server 2000 may identify dimensions of the obtained spatial maps. Referring to FIG. 5B, because the first spatial map 510 and the second spatial map 520 have different dimensions, and the dimension of the first spatial map 510 is higher than that of the second spatial map 520, the server 2000 may project the first spatial map 510 into the lower dimension.

In an embodiment of the disclosure, the server 2000 may use height information from a lower dimensional spatial map when projecting a higher dimensional spatial map into the lower dimension. For example, the server 2000 may use height information from the second spatial map 520 when projecting the first spatial map 510 into two dimensions.

The second spatial map 520 may be a 2D occupancy grid map generated by a robot cleaner. The robot cleaner moves in the space and generates the second spatial map 520 that is 2D based on one or more pieces of sensor data. According to a field of view (FOV) of a sensor of the robot cleaner, only an area at a height of 30 cm or less from the floor of the space may be sensed. Accordingly, referring to second map features 524 corresponding to the second spatial map 520, a map feature indicating that information related to a height within the space included in the second spatial map 520 is information corresponding to a height of 30 cm or less may be included in the second map features 524. In order to match an information level of the first spatial map 510 with that of the second spatial map 520, the server 2000 may project only information corresponding to the height of 30 cm or less in the space when projecting the first spatial map 510 into two dimensions. This is further described below with specific examples.

For example, when projecting a 3D object 'L-shaped dining table 512' existing in the first spatial map 510 into two dimensions, the server 2000 may project only portions of the L-shaped dining table 512, which are at a height of 30 cm or less, i.e., information about legs of the dining table. As a result, the L-shaped dining table 512 in the first spatial map 510 may be projected into 2D data in the second spatial map 520, which has the same shape as a dining table 522 in a 2D map from a robot cleaner's point of view.

For example, when projecting a 3D object 'sofa' existing in the first spatial map 510 into two dimensions, the server 2000 may project only portions of the sofa, which are at a height of 30 cm or less, i.e., information about legs of the sofa.

For example, the server 2000 may not project objects (e.g., a ceiling mounted system air conditioner, etc.) existing in the first spatial map 510, which are located in an area that is at a height greater than 30 cm.

The server 2000 may tag attribute information on map features that may be used for aligning the spatial maps. For example, the server 2000 may tag attribute information of the first map feature 514 while projecting the 3D first spatial map 510 into two dimensions. In the above-described example, as the 'sofa' is projected into two dimensions, attribute information may be tagged onto areas with the legs of the sofa, and as the 'L-shaped dining table 512' is projected into two dimensions, attribute information may be tagged onto areas with the legs of the dining table. In addition, because objects located in an area at a height of 30 cm or more are excluded during 2D projection, attribute information corresponding to the excluded objects is not tagged in the projected spatial map.

In an embodiment of the disclosure, the server 2000 may align the spatial maps with the matched dimensions. For example, when the first spatial map 510 and the second spatial map 520 have the same dimensions, the server 2000 may directly perform map alignment between the first spatial map 510 and the second spatial map 520. When the first spatial map 510 and the second spatial map 520 have different dimensions, the server 2000 may perform map alignment between 2D spatial maps with the dimensions matched through dimensional projection. This will be further described with reference to FIG. 6.

Figure 6:
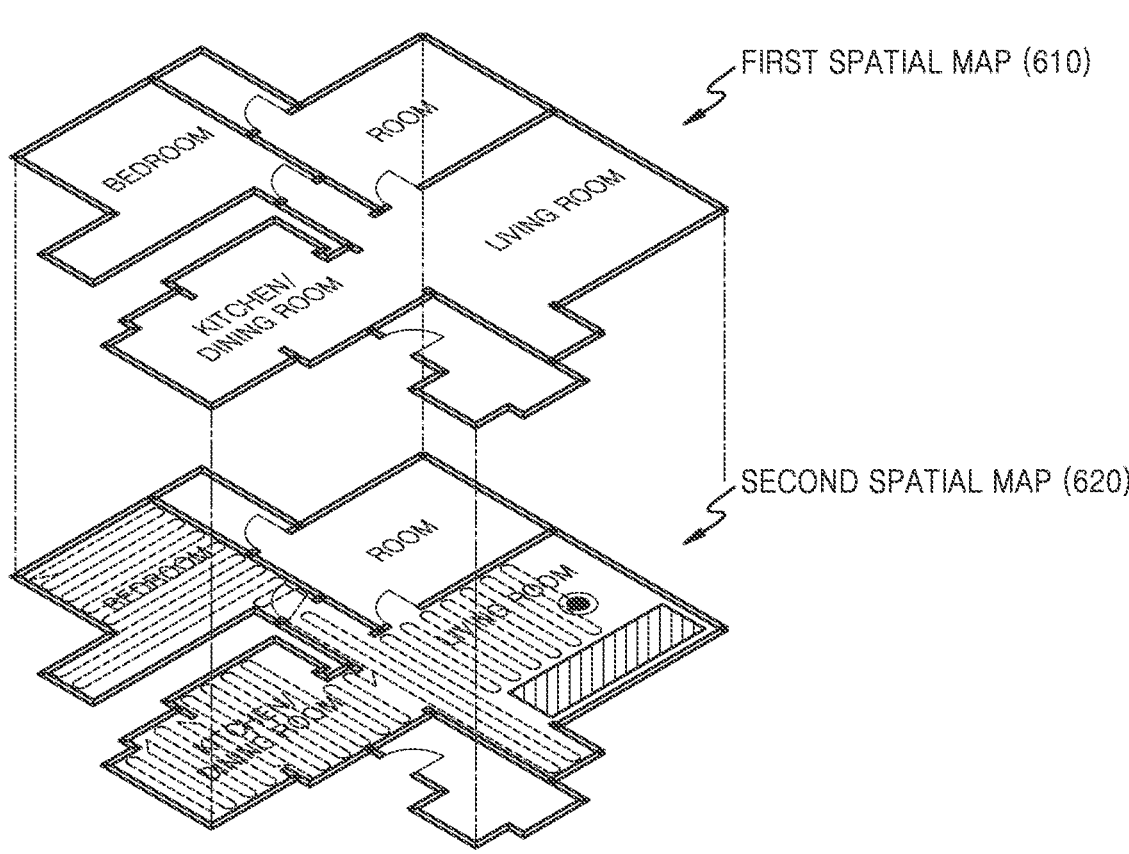
FIG. 6 is a diagram illustrating an operation in which a server performs map alignment, according to an embodiment of the disclosure.

FIG. 6 is a diagram illustrating an operation in which a server performs map alignment, according to an embodiment of the disclosure.

In an embodiment of the disclosure, the first spatial map 610 may be aligned with the second spatial map 620. The server 2000 may select map features for map alignment from among first map features of the first spatial map 610 and second map features of the second spatial map 620. The selected map features may be map features that are commonly present in both the first spatial map 610 and the second spatial map 620.

For example, the server 2000 may select map features indicating spatial layout information among the first map features in the first spatial map 610 and map features representing spatial layout information among the second map features in the second spatial map 620. For example, the server 2000 may select map features representing object-related information among the first map features in the first spatial map 610 and map features representing object-related information among the second map features in the second spatial map 620.

The server 2000 may align the first spatial map 610 and the second spatial map 620 based on the selected map features.

Moreover, for map alignment, various map alignment algorithms may be used in a complementary manner. For example, the server 2000 may detect feature lines (e.g., walls) and feature points (e.g., corner points) in spatial maps, and align the spatial maps based on the detected feature lines and feature points.

The server 2000 may detect a minimum bounding box including feature lines and feature points. The server 2000 may align the first spatial map 610 and the second spatial map 620 by aligning at least one of the feature lines or feature points between the first spatial map 610 and the second spatial map 620. In addition, the server 2000 may align the first spatial map 610 and the second spatial map 620 by aligning a size and an orientation of minimum bounding boxes between the first spatial map 610 and the second spatial map 620.

FIG. 7A is a diagram illustrating an operation in which a server evaluates confidence between aligned maps, according to an embodiment of the disclosure.

In an embodiment of the disclosure, one or more first spatial maps 710 may be provided. Also, one or more second spatial maps 720 may be provided. After aligning the first spatial map 710 and the second spatial map 720, the server 2000 may calculate confidence of the first spatial map 710 and the second spatial map 720.

The server 2000 may calculate an error between a first map feature in the first spatial map 710 and a second map feature in the second spatial map. For example, the server 2000 may calculate an error between spatial layouts and an error between objects.

The server 2000 may calculate an error $E_m$ between map structures in the first spatial map 710 and the second spatial map 720. The error $E_m$ between map structures may indicate whether spatial layouts do not match each other. The error $E_m$ between map structures may be defined as a root mean square error (RMSE) for the one or more first spatial maps 710 and the one or more second spatial maps 720. In an embodiment of the disclosure, the server 2000 may apply a higher weight to a spatial map that is generated more recently.

The server 2000 may calculate an error $E_o$ between objects in the first spatial map 710 and the second spatial map 720. The error $E_o$ between objects may indicate whether the objects in a space do not match each other. For example, the server 2000 may calculate an Intersection over Union (IoU) of objects overlapping each other in the first spatial map 710 and the second spatial map 720. When the IoU is greater than or equal to a preset value (e.g., 0.5), the server 2000 may compare pieces of feature attribute information tagged onto map features. For example, the server 2000 may compare types (classes) of overlapping objects in the first spatial map 710 and the second spatial map 720, but is not limited thereto. For example, when there is no class information about objects tagged onto map features, the server 2000 may compare only matching between positions of the objects.

The server 2000 may use the error $E_m$ between map structures and the error $E_o$ between objects to calculate a confidence $C_m$ ($C_m=1/(E_m+\lambda E_o)$ where $\lambda$ is a parameter set according to confidence of object detection).

As a result of the server 2000 calculating a confidence $C_m$ for the one or more first spatial maps 710 and the one or more second spatial maps 720, spatial maps determined to have a low confidence may be removed. That is, at least some of the one or more first spatial maps 710 and the one or more second spatial maps 720 may be removed and not used to generate a personalized spatial map.

Figure 7B:
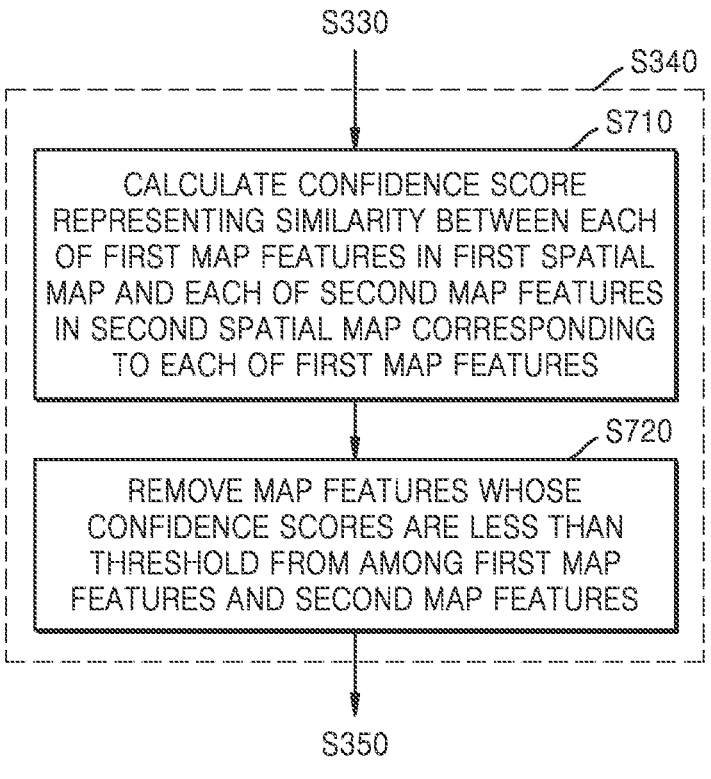
FIG. 7B is a flowchart illustrating an operation in which a server evaluates a confidence between map features for aligned maps, according to an embodiment of the disclosure.

FIG. 7B is a flowchart illustrating an operation in which a server evaluates a confidence between map features in aligned maps, according to an embodiment of the disclosure.

In an embodiment of the disclosure, in addition to calculating confidence between spatial maps, server 2000 may also calculate confidence between map features in the spatial maps. Operations of FIG. 7B may be performed after selecting the map features in operation S330. Also, the operations of FIG. 7B may replace operation S340 of FIG. 3.

In operation S710, the server 2000 calculates a confidence score representing a similarity between each of the first map features in the first spatial map 710 and each of the second map features in the second spatial map 720 corresponding to each of the first map features. For example, a map feature may include information related to an object. When the first spatial map 710 and the second spatial map 720 are aligned to overlap, the server 2000 may compare pieces of information related to objects existing at the same position. In detail, the server 2000 may compare sizes, types, identification information, orientations, etc. of the objects.

In operation S720, the server 2000 removes map features whose confidence scores are less than a threshold from among the first map features and the second map features.

A map feature whose confidence score is less than the threshold means that data included in a corresponding map is inaccurate. For example, fixed elements in the space (e.g., walls, a built-in cabinet, etc.) are less likely to change, while movable elements in the space (e.g., movable objects such as chairs, etc.) are more likely to change. The pre-generated first spatial map 710 is a spatial map generated at an earlier time point than the second spatial map 720, and some elements present in the first spatial map 710 may not exist in the second spatial map 720 generated at a later time point. Accordingly, in order to exclude inaccurate data elements from each spatial map, the server 2000 may use a confidence score. As a result of the server 2000 refining the first spatial map 710 and the second spatial map 720 based on a confidence score, various map features may be removed. For example, map features corresponding to movable elements may be removed from the first spatial map 710 generated at an initial time point when the space was created.

Moreover, the one or more first spatial maps 710 may be provided. Also, the one or more second spatial maps 720 may be provided. When calculating confidence scores of map features, the server 2000 may apply, when a plurality of spatial maps exist, a weight based on a time point when the spatial maps are updated. For example, the server 2000 may apply a higher weight to spatial maps that are updated more recently, so that more recently generated map features may be trusted. Because map features in spatial maps generated at an earlier time point have a lower confidence, the map features are more likely to be removed.

After operation S720 is performed, operation S350 of FIG. 3A may be performed.

FIG. 7C is a diagram illustrating an example in which a server determines a confidence for aligned maps, according to an embodiment of the disclosure.

As described above, the server 2000 may tag pieces of attribute information related to features onto the first map features in the first spatial map 710 and the second map features in the second spatial map 720. For example, the server 2000 may tag information related to an update time of a spatial map.

The pre-generated first spatial map 710 is a spatial map generated at an earlier time point than the second spatial map 720. Therefore, when an update time of the first spatial map 710 is unknown, the update time may not be tagged onto the first map features in the first spatial map 710, or even when the update time is tagged onto the first map features in the first spatial map 710, the update time may be earlier than an update time tagged onto the second map features in the second spatial map 720. The server 2000 may set a confidence score based on a map feature having a most recent update time.

In a specific example, the first map features in the first spatial map 710 may include a built-in cabinet 730 as information related to an object. Furthermore, the second map features in the second spatial map 720 may include the built-in cabinet 730 and a built-in refrigerator 740 as information related to an object. In addition, the second map features in the second spatial map 720 may include information about an update time.

The server 2000 may assign, based on the update time, a high confidence score to the built-in cabinet 730 and the built-in refrigerator 740 included in the second map features in the second spatial map 720 that have been updated more recently. That is, the server 2000 may prevent map features corresponding to the built-in cabinet 730 and the built-in refrigerator 740 from being removed by assigning a higher weight to map features in a spatial map that is updated more recently.

Figure 8A:
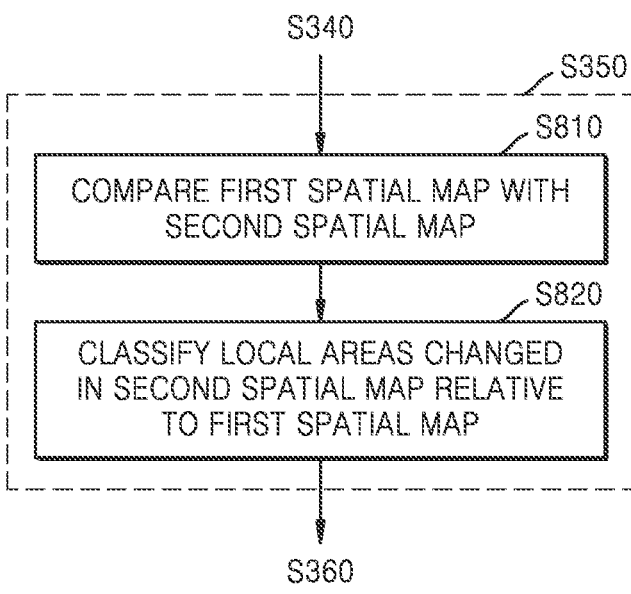
FIG. 8A is a flowchart illustrating an operation in which a server identifies local areas in a space where differences exist between a first spatial map and a second spatial map, according to an embodiment of the disclosure.

FIG. 8A is a flowchart illustrating an operation in which a server identifies local areas in a space where differences exist between a first spatial map and a second spatial map, according to an embodiment of the disclosure.

Operations of FIG. 8A may be performed after map alignment is performed in operation S340 of FIG. 3. Also, operations of FIG. 8A may replace operation S350 of FIG. 3.

In operation S810, the server 2000 compares the first spatial map with the second spatial map.

After performing map alignment between the first spatial map and the second spatial map, the server 2000 may identify local areas in the space where differences exist between the first spatial map and the second spatial map. For example, the first spatial map and the second spatial map are each a spatial map for the entire area (global area) of the space. The entire area of the space may be classified into a plurality of local areas. For example, when the entire area of the space is a 'house', local areas may be 'room', 'bedroom', 'living room', 'kitchen', etc., but are not limited thereto.

In operation S820, the server 2000 classifies local areas changed in the second spatial map relative to the first spatial map.

The local areas identified as having differences between the first spatial map and the second spatial map indicate that spatial information has been changed at a time point after the pre-generated first spatial map is obtained. The server 2000 may classify the changed local areas according to types of changes. For example, the server 2000 may classify the changed local areas as at least one of a local area where an object is changed, a local area where a spatial layout is changed, or a local area containing measurement noise, but the classification is not limited thereto.

After operation S820 is performed, operation S360 of FIG. 3A may be performed.

In an embodiment of the disclosure, the server 2000 may perform operations S810 and S820 by using an AI model. An operation of the server 2000 using an AI model is further described in the description with respect to FIG. 8B.

FIG. 8B is a diagram illustrating an AI model used by a server, according to an embodiment of the disclosure.

In an embodiment of the disclosure, the server 2000 may use an AI model (hereinafter, a spatial change detection model) 800 to identify local areas in the space where differences exist between the first spatial map and the second spatial map. The spatial change detection model 800 may be a deep neural network model that takes the first spatial map and the second spatial map as an input and outputs information about local areas where differences exist between the first spatial map and the second spatial map. The spatial change detection model 800 may be implemented using various known deep neural network architectures and algorithms, or through variations of the various known deep neural network architectures and algorithms. FIG. 8B illustrates training the spatial change detection model 800.

In an embodiment of the disclosure, the server 2000 may train the spatial change detection model 800 based on a training data set including various spatial maps. The training dataset may include various 2D or 3D spatial maps. Also, spatial maps representing the same space may be stored in pairs. For example, a floorplan 810 or a synthetic floorplan 812, which is a spatial map representing the same space, and a lidar map 814 may be stored as a pair in the training dataset.

The floorplan 810 corresponds to a first spatial map, and the lidar map 814 corresponds to a second spatial map. In addition, the synthetic floorplan 812 is generated by applying a data augmentation algorithm to the floorplan 810 to train the spatial change detection model 800, and corresponds to the first spatial map. However, FIG. 8B merely shows an example, and a data augmentation algorithm may be applied to the lidar map 814 to train the spatial change detection model 800. Map data obtained by augmenting the lidar map 814 corresponds to the second spatial map. Various data augmentation algorithms are described later with reference to FIG. 8C.

In an embodiment of the disclosure, the server 2000 may train the spatial change detection model 800 by using training data including pairs of the floorplan 810 and the lidar map 814. When there is no difference between the floorplan 810 and the lidar map 814 due to no change in spatial information about the space, the spatial change detection model 800 is trained to classify it as 'no change'.

In an embodiment of the disclosure, the server 2000 may train the spatial change detection model 800 by using training data including pairs of the floorplan 810 and the lidar map 814. The lidar map 814 is based on sensor data, and noise 804 may be included in data from a lidar sensor due to glass or the like present in the space. When noise is included in the lidar map 814, the spatial change detection model 800 is trained to classify it as 'noise in the second spatial map'.

In an embodiment of the disclosure, the server 2000 may train the spatial change detection model 800 by using training data including pairs of the synthetic floorplan 812 and the lidar map 814. When the first spatial map (synthetic floorplan 812) and the second spatial map (lidar map 814) are generated at different time points, spatial information about the space may have been changed. For example, an object 802 may exist in the synthetic floorplan 812, but not in the lidar map 814. The spatial change detection model 800 is trained to classify it as 'object removed'.

According to an embodiment of the disclosure, by using pairs of the first spatial map and the second spatial map, the server 2000 may train the spatial change detection model 800 to classify a change in a local area in the space. Spatial change classification categories 815 from the space change detection model 800 may be obtained by, for example, classifying changes in the space into 'object added', 'object removed', 'layout added', 'layout removed', 'noise', etc., but the space change classification categories 815 are not limited thereto.

According to an embodiment of the disclosure, the server 2000 may identify local areas where differences exist between the first spatial map and the second spatial map by using the trained spatial change detection model 800. The server 2000 may input the first spatial map and the second spatial map to the spatial change detection model 800. The spatial change detection model 800 classifies whether a change in a local area where a difference exists between the first spatial map and the second spatial map is a change in an object and/or a layout, a difference due to noise, etc. The server 2000 may obtain information about the local areas output from the space change detection model 800.

Figure 8C:
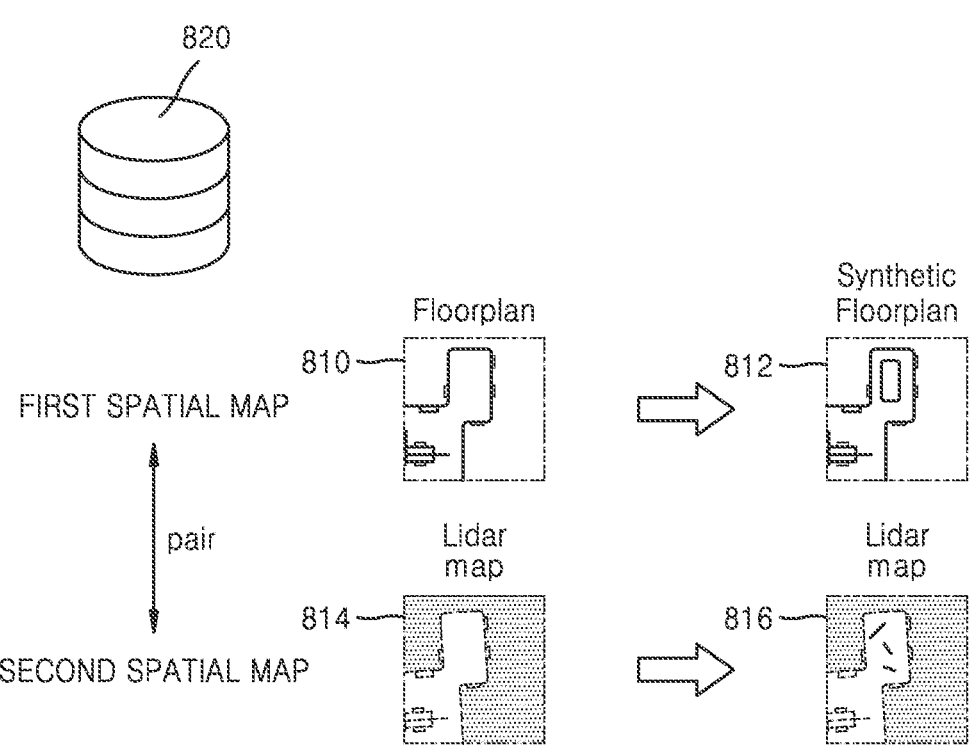
FIG. 8C is a diagram illustrating an operation in which a server generates training data for an AI model, according to an embodiment of the disclosure.

FIG. 8C is a diagram illustrating an operation in which a server generates training data for an AI model, according to an embodiment of the disclosure.

Referring to FIG. 8C, the server 2000 trains the spatial change detection model 800 by using a training dataset 820. The training dataset 820 may include a plurality of spatial maps with the first spatial map and the second spatial map stored in pairs.

In an embodiment of the disclosure, the server 2000 may augment training data included in the training dataset 820 for the spatial change detection model 800. The server 2000 may select at least one of the pair of the first spatial map and the second spatial map, and augment the training data by adding or removing an object/layout/noise, etc.

For example, a floorplan 810 may correspond to the first spatial map the in the training dataset 820, and a lidar map 814 may correspond to the second spatial map in the training dataset 820. The server 2000 may generate a synthetic floorplan 812 by adding an object to the floorplan 810. In addition, the server 2000 may generate a synthetic lidar map 816 by adding noise to the lidar map 814.

In an embodiment of the disclosure, when augmenting training data by adding an object/layout/noise, etc. to the training data, the server 2000 may augment the training data by pulling information related to an object/layout/noise, etc. from another map pair that has already been well matched.

In an embodiment of the disclosure, the server 2000 may use a generative adversarial network (GAN) when augmenting data by adding an object/layout/noise, etc. to training data. lThe GAN may include two modules, i.e., a generator and a discriminator. The generator may learn real data such as an object/layout/noise, etc. The generator may be trained to generate fake data such as an object/layout/noise, etc. to be close to real data such as an object/layout/noise, etc., and the discriminator may be trained to discriminate whether the data output by the generator is fake data or real data. The GAN may be a known architecture and algorithm, or various variants for optimization of the known architecture and algorithm. The server 2000 may obtain training data including an object/layout/noise, etc., for which it is difficult to collect real data, by using the GAN.

Moreover, augmentation of training data by the server 2000 is not limited to 'adding' the object/layout/noise, etc. The server 2000 may augment the training data in various ways, including removing, copying/pasting, rotating, and flipping the object/layout/noise. etc.

In an embodiment of the disclosure, training data obtained by the server 2000 through data augmentation may be included in the training dataset 820. The server 2000 may use various combinations when storing the augmented training data in the training dataset 820 as pairs of the first spatial map and the second spatial map. For example, the server 2000 may store the floorplan 810 and the lidar map 814 as a pair. Alternatively, the server 2000 may store the floorplan 810 and the synthetic lidar map 816 as a pair. Alternatively, the server 2000 may store the synthetic floorplan 812 and the lidar map 814 as a pair. Alternatively, the server 2000 may store the synthetic floor plan 812 and the synthetic lidar map 815 as a pair.

Figure 9A:
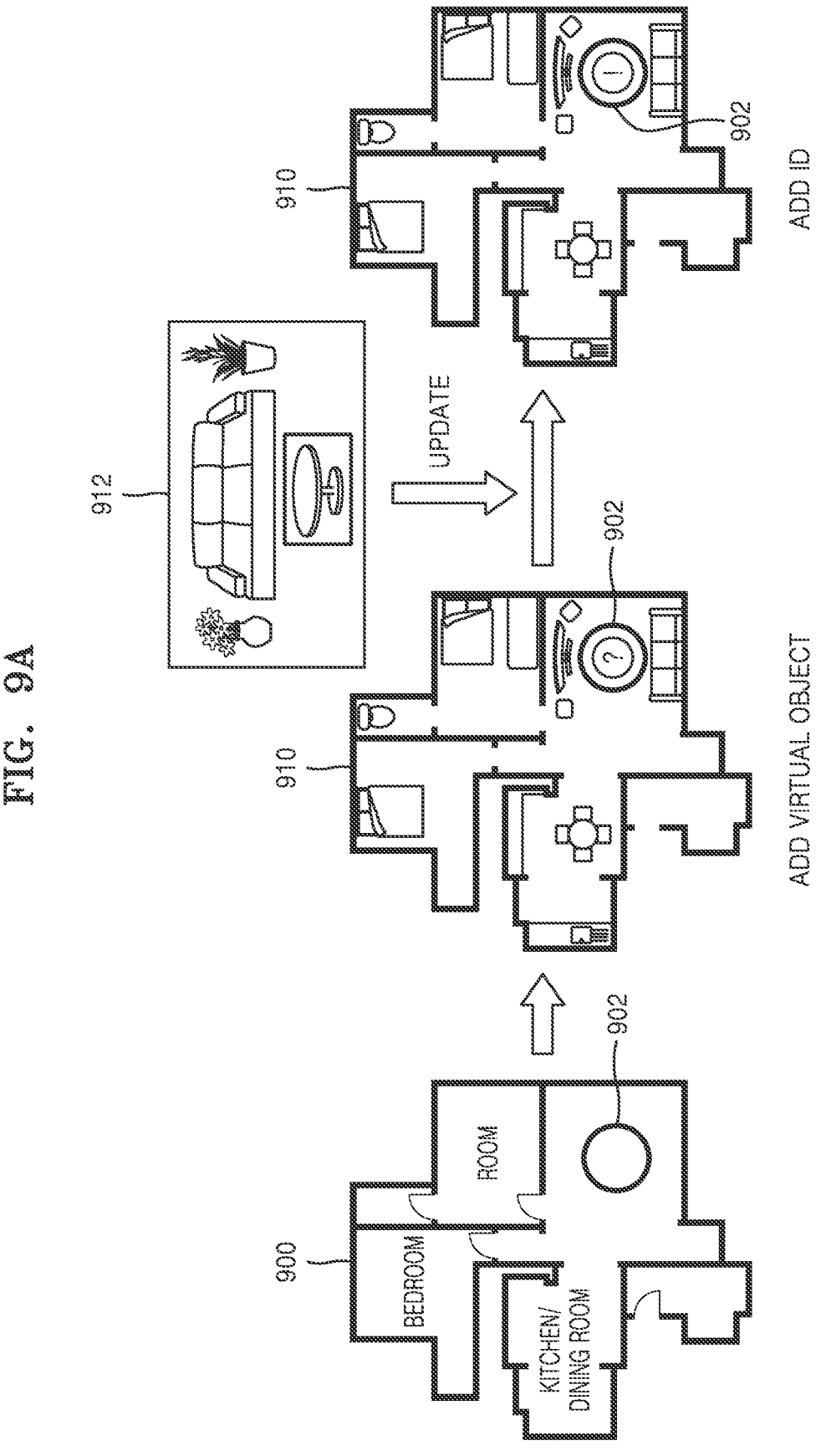
FIG. 9A is a diagram illustrating an example in which a server generates a personalized spatial map, according to an embodiment of the disclosure.

FIG. 9A is a diagram illustrating an example in which a server generates a personalized spatial map, according to an embodiment of the disclosure.

In an embodiment of the disclosure, when identifying a changed local area 902, the server 2000 may generate a personalized spatial map 910 by determining spatial information about the changed local area 902 based on second map features in a second spatial map. A base map for the personalized spatial map 910 may be a first spatial map 900, but is not limited thereto, and the second spatial map may be used as the base map.

As a result of the server 2000 classifying the changed local area 902 in the second spatial map based on the first spatial map 900, the local area 902 may be a local area where an object is changed. As a specific example, the change may be the addition of an object. This means that no object exists in an area corresponding to the local area 902 in the pre-generated first spatial map 900, but an object exists in an area corresponding to the local area 902 in the second spatial map generated later. The server 2000 may determine spatial information about the local area 902 based on the second map features in the second spatial map. For example, the second map features in the second spatial map may include information related to the object existing in the local area 902. The server 2000 may add a virtual object to an area corresponding to the local area 902 in the personalized spatial map 910. Alternatively, the server 2000 may remove or change an object in the space in the same/similar manner as described above.

Moreover, the server 2000 may update the personalized spatial map 910 based on data (e.g., a third spatial map obtained by capturing an image of the local area 902) received from the user (e.g., the user's electronic device). For example, the server 2000 may receive an image 912 of the local area 902 captured by the user, and update the personalized spatial map 910 based on the received image 912. As a result, information about an object located in the local area 902 in the personalized spatial map 910 may be updated. For example, identification information (a model name, a serial number, etc.) about the object may be updated, but the disclosure is not limited thereto. An operation in which the server 2000 additionally updates the personalized spatial map 910 is further described in the description with respect to FIG. 10.

Figure 9B:
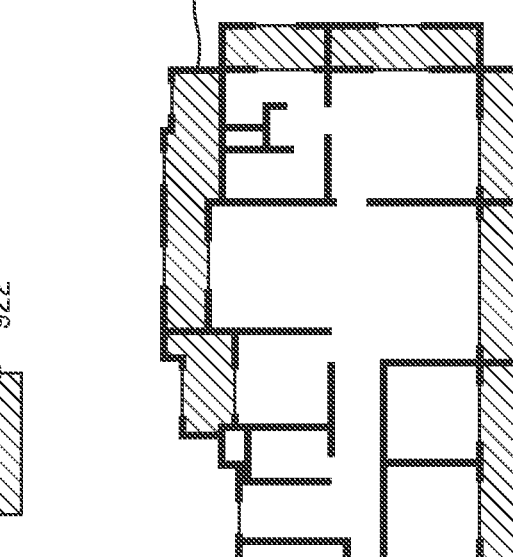
FIG. 9B is a diagram illustrating an example in which a server generates a personalized spatial map, according to an embodiment of the disclosure.

FIG. 9B is a diagram illustrating an example in which a server generates a personalized spatial map, according to an embodiment of the disclosure.

In an embodiment of the disclosure, when identifying a changed local area 922, the server 2000 may generate a personalized spatial map 930 by determining spatial information about the changed local area 922 based on second map features in a second spatial map. A map 920 that is a base map for the personalized spatial map 930 may be a first spatial map, but is not limited thereto, and the second spatial map may be used as the base map.

As a result of the server 2000 classifying the changed local areas 922 in the second spatial map based on the first spatial map, the local areas 902 may be local areas with a changed spatial layout. In a specific example, the change may be the removal of walls. This means that some of the walls existing in the pre-generated first spatial map do not exist in the second spatial map due to a change in an interior design (e.g., balcony extension, etc.). The server 2000 may determine spatial information about the changed local areas 922 based on the second map features in the second spatial map. For example, the second map features in the second spatial map may include information related to a spatial layout, and specifically, information related to a spatial layout expanded by removing inner walls of the local areas 922. The server 2000 may remove the inner walls of the local areas 922 in the personalized spatial map 930 to represent an expanded space. Alternatively, the server 2000 may add a virtual wall in the space in the same/similar manner as described above, and may add/remove/change other spatial layout elements.

Moreover, although a change in an object has been described with reference to FIG. 9A, and a change in a spatial layout has been described with reference to FIG. 9B, they are not independent of each other and may be combined. That is, a change in a spatial layout may be reflected in the personalized spatial map 910 of FIG. 9A, and a change in an object may also be reflected in the personalized spatial map 930 of FIG. 9B.

FIG. 9C is a diagram illustrating an example in which a server generates a personalized spatial map, according to an embodiment of the disclosure.

In an embodiment of the disclosure, the server 2000 may compare a first spatial map with a second spatial map 940. The server 2000 may identify changed local areas where differences exist between the first spatial map and the second spatial map, and classify the changed local areas.

Moreover, the second spatial map 940 is based on sensor data, and may include various measurement noise depending on a type of sensor and an environment in the space. The server 2000 may classify the changed local areas as noise. For example, the server 2000 may compare the first spatial map with the second spatial map 940, and applying an algorithm for noise detection based on a comparison result to identify areas in the second spatial map 940 where noise exists. Alternatively, the server 2000 may apply an algorithm for noise detection to the second spatial map 940 to identify areas in the second spatial map 940 where noise exists. As an algorithm for noise detection, various known algorithms may be adopted. Alternatively, the server 2000 may identify areas in the second spatial map 940 where noise exists by using a spatial change detection model.

When it is determined that measurement noise from sensor data exists in the second spatial map 940, the server 2000 may remove the noise from the second spatial map 940 to obtain a noise-free second spatial map 950 with improved map quality.

The server 2000 may identify a changed local area in the space by using the noise-free second spatial map 950. This has been described above, and thus, is not repeated for brevity.

FIG. 10 is a flowchart illustrating an operation in which a server updates a local area in a personalized spatial map, according to an embodiment of the disclosure.

Operations of FIG. 10 may be performed after the personalized spatial map is generated in operation S360 of FIG. 3.

In operation S1010, the server 2000 obtains a third spatial map generated based on sensor data obtained by measuring one of the local areas in the space.

Each of the first spatial map and the second spatial map is a spatial map including spatial information about the entire area (global area) of the space. The entire area of space may be divided into a plurality of local areas. The server 2000 may obtain a third spatial map including spatial information about any one of the plurality of local areas. For a more specific example that illustrates a relationship between the personalized spatial map and the third spatial map, when the personalized spatial map is a spatial map for the entire area of the space, 'house', the third spatial map may be a spatial map for a local area 'bedroom' that is a part of the entire area.

The third spatial map may be a spatial map generated based on sensor data. The third spatial map may be, for example, a spatial map generated based on an image of the space captured by the user via an electronic device (e.g., a smartphone, etc.) including a camera, or a spatial map generated by an electronic device (e.g., an indoor robot, a robot cleaner, an IP camera, etc.) operating within the user's space. The third spatial map may include features representing spatial information about a local area. For example, the third spatial map may include layout information about the local area, information related to an object in the local area, etc., but is not limited thereto.

In operation S1020, the server 2000 identifies, in the personalized spatial map, a local area corresponding to the local area in the third spatial map. The server 2000 may identify which local area the third spatial map corresponds to from among a plurality of local areas included in the personalized spatial map. For example, the server 2000 may identify that the third spatial map is a spatial map for a 'bedroom' from among the plurality of local areas 'room', 'bedroom', 'living room', and 'kitchen' included in the personalized spatial map.

In an embodiment of the disclosure, the server 2000 may identify, based on a user input, a local area corresponding to the third spatial map in the personalized spatial map. The server 2000 may receive a user input for selecting a particular local area in the personalized spatial map from the user's electronic device, and identify the area corresponding to the user input as a local area corresponding to the local area in the third spatial map.

In an embodiment of the disclosure, the server 2000 may identify a local area corresponding to the third spatial map in the personalized spatial map, based on map features in the third spatial map and map features in the personalized spatial map. The server 2000 may compare the map features in the third spatial map with the map features in the personalized spatial map, and calculate a similarity between common map features. For example, the server 2000 may calculate confidence scores between map features, but is not limited thereto. Based on a result of the comparing of the map features, the server 2000 may identify an area in the personalized spatial map, which includes map features that are identical/similar to those in the third spatial map, as a local area corresponding to the local area in the third spatial map.

In an embodiment of the disclosure, the server 2000 may identify a local area corresponding to the third spatial map within the personalized spatial map by using a map alignment algorithm. The server 2000 may identify, in the personalized spatial map, an area having an identical/similar structure to a map structure (e.g., a spatial layout, etc.) of the third spatial map. The server 2000 may identify, based on a map alignment result, a local area in the personalized spatial map, which corresponds to the local area in the third spatial map.

The above-described methods of identifying a local area corresponding to the third spatial map in the personalized spatial map are not independent of each other, and the server 2000 may use a combination of two or more of the methods.

Moreover, the personalized spatial map and the third spatial map may have different spatial dimensions. When the personalized spatial map and the third spatial map have different spatial dimensions, the server 2000 may project a higher dimensional spatial map into a lower dimension. For example, the personalized spatial map may be a 2D spatial map, and the third spatial map may be a 3D spatial map. The server 2000 may project the third spatial map into two dimensions.

In operation S1030, the server 2000 matches an object and a layout in the identified local area in the personalized spatial map with an object and a layout in the third spatial map. In detail, as in the above example, when the third spatial map is for the bedroom, the server 2000 may match an object/layout in a local area corresponding to the bedroom in the personalized spatial map with an object/layout in the third spatial map.

In an embodiment of the disclosure, as a result of the server 2000 classifying whether a local area in the user's space has changed based on the first spatial map and the second spatial map according to the above-described embodiment of the disclosure, a local area classified as having an object added may exist. The server 2000 adds an object (e.g., a virtual object) to the personalized spatial map. This means that 'object A' has been newly placed in the user's space, and the 'object A' is added to the personalized spatial map accordingly. Also, the 'object A' may be included in the third spatial map obtained by recapturing an image of the local area. The server 2000 may match the 'object A' in the personalized spatial map with the 'object A' in the third spatial map.

In an embodiment of the disclosure, because the third spatial map is a spatial map generated by scanning only the local area, spatial information in the third spatial map may include more accurate and detailed information than in the first spatial map and/or the second spatial map for only the local area. For example, the third spatial map may include detailed information such as a model name, identification number, and color of an object, but is not limited thereto. The server 2000 may determine and update, based on map features in the third spatial map, spatial information about the local area identified in operation S1020. In detail, the server 2000 may update detailed information about the matched 'object A' such as a model name, identification number, and color of the object A.

In operation S1040, the server 2000 performs texture mapping on the personalized spatial map based on a matching result.

The server 2000 may map textures included in the third spatial map to the object and/or the layout in the personalized spatial map by using a texture mapping algorithm. The textures may include surface texture and color, but are not limited thereto. For example, when the third spatial map is a spatial map for the bedroom, the server 2000 may perform texture mapping on a local area corresponding to the bedroom in the personalized spatial map. The map features in the personalized spatial map may be updated. As a result of the texture mapping performed by the server 2000, the bedroom in the personalized spatial map may have the same spatial information as the user's real-world bedroom. That is, textures of a layout (walls, windows, etc.) and objects (a TV, a bed, a bookshelf, etc.) from the user's real-world bedroom (ok?) may be reflected in the personalized spatial map.

Figure 11A:
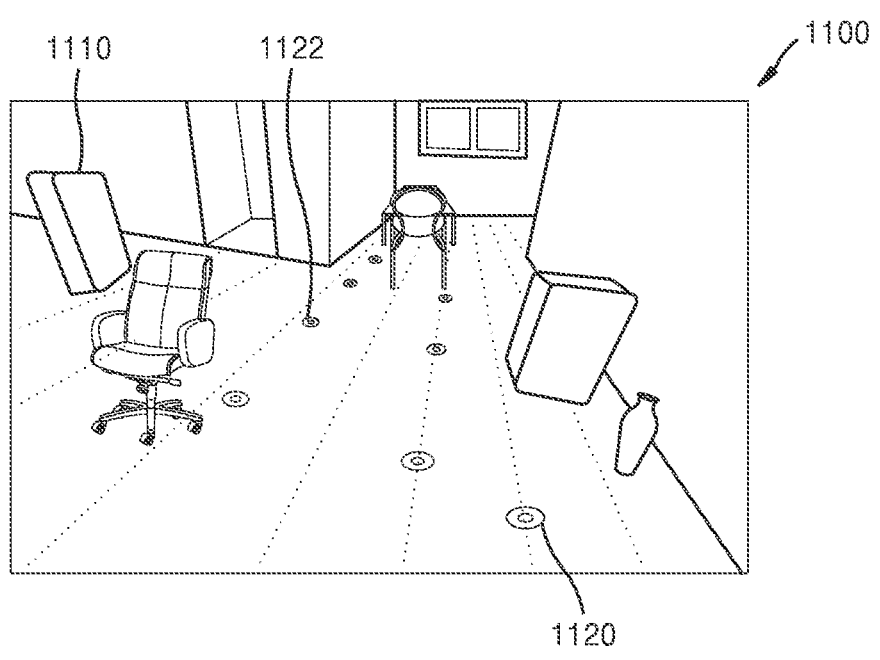
FIG. 11A is a diagram illustrating an operation in which a server provides a virtual space based on a personalized spatial map, according to an embodiment of the disclosure.

FIG. 11A is a diagram illustrating an operation in which a server provides a virtual space based on a personalized spatial map, according to an embodiment of the disclosure.

In an embodiment of the disclosure, the server 2000 may generate, based on a personalized spatial map, a personalized virtual space 1100 (hereinafter referred to as a virtual space) corresponding to a user's real-world space. The virtual space 1100 may include a spatial layout and objects from the user's real-word space. Because the virtual space 1100 generated based on the personalized spatial map is an implementation of the user's real-world space as a virtual environment, the virtual space 1100 may include objects existing in the user's space. The user may perform various virtual space experience activities, such as changing the placement of objects in the virtual space 1100 and appreciating the virtual space 1100.

In an embodiment of the disclosure, when the user selects an object 1110 existing in the virtual space 1100, detailed information related to the object 1110 may be displayed. The detailed information related to the object 1110 may include a model name, identification number, a color, a user manual, etc. of the object 1110. In addition, a recommendation of an object similar to the selected object 1110 (e.g., a recommendation for a purchase or change) may be provided, but the disclosure is not limited thereto.

In an embodiment of the disclosure, the user may change an interior design by using the virtual space 1100. For example, after selecting the object 1110 existing in the virtual space 1100, the user may remove or move the selected object 1110 from the virtual space 1100. For example, the user may select an empty area in the virtual space 1100 and place a new object in the selected area.

In an embodiment of the disclosure, the user may navigate within the virtual space 1100. For example, when the user selects a first viewpoint 1120 existing in the virtual space 1100, a 360-degree view of the virtual space 1100 rendered based on the first viewpoint 1120 may be provided. In addition, when the user selects a second viewpoint 1122 existing in the virtual space 1100, a 360-degree view of the virtual space 1110 rendered based on the second viewpoint 1122 may be provided.

In an embodiment of the disclosure, examples of the user using the virtual space 1100 may be provided via the user's electronic device 3000. That is, the server 2000 may transmit virtual spatial data to the user's electronic device 3000, and the virtual space 1100 may be displayed on the user's electronic device 3000 including a display. For example, the user's electronic device 3000 may include, but is not limited to, a smartphone, an HMD (e.g., an AR/VR device), a smart TV, a tablet PC, and a laptop computer, etc. The user's electronic device 3000 may be implemented as a device (e.g., a desktop computer) separate from a display and connectable to a display device (e.g., a monitor).

Figure 11B:
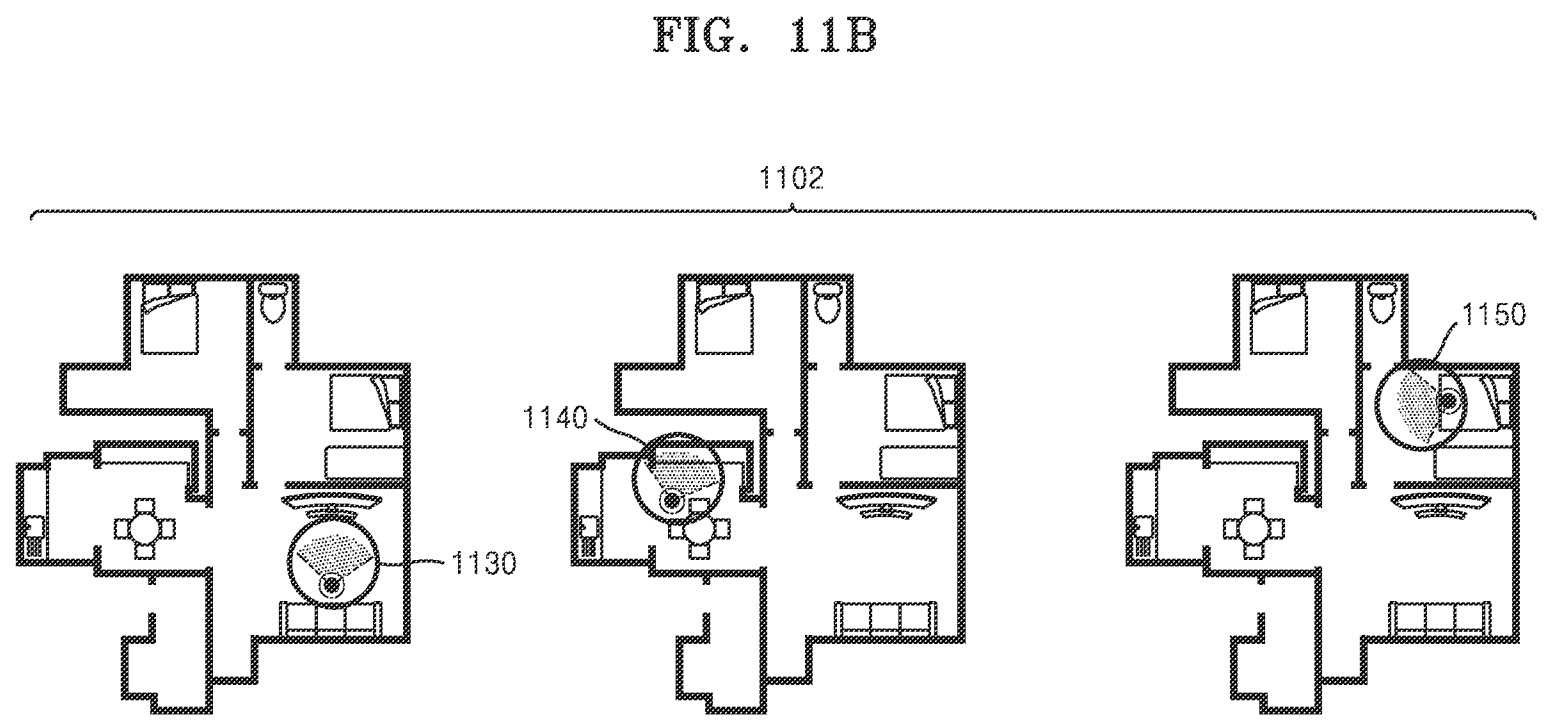

FIG. 11B is a diagram illustrating an operation in which a server provides a virtual space based on a personalized spatial map, according to an embodiment of the disclosure.

In an embodiment of the disclosure, the server 2000 may provide both the virtual space 1100 and the personalized spatial map 1102. While navigating the virtual space 1100 by using the user's electronic device 3000, the user may check where a current location is within the virtual space 1100 through the personalized spatial map 1102 displayed together. The personalized spatial map 1102 may be displayed in a corner area of a screen on which the virtual space 1100 is displayed, but is not limited thereto.

In illustrations of the personalized spatial map 1102 of FIG. 11B, the user is shown to be located in a different virtual space.

For example, when the user is located in a living room 1130 in the virtual space 1100, the personalized spatial map 1102 may indicate that the user's current location is the living room 1130. Furthermore, the personalized spatial map 1102 may indicate in which direction the user's FOV is oriented. Also, when the user is located in a kitchen 1140 or a bedroom 1150, a user's current location may be indicated on the personalized spatial map 1102. At the user's current location, a 360-degree view of the virtual space 1100 may be provided.

Figure 12:
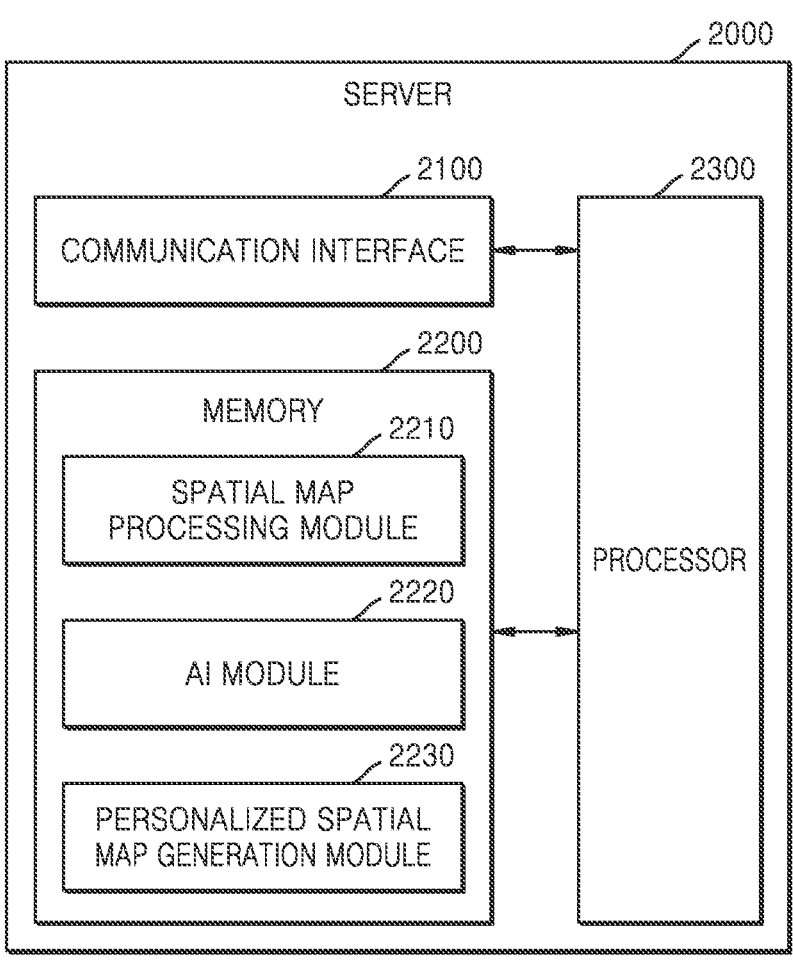
FIG. 12 is a block diagram of a configuration of a server, according to an embodiment of the disclosure.

FIG. 12 is a block diagram of a configuration of a server according to an embodiment of the disclosure.

According to an embodiment of the disclosure, the server 2000 may include a communication interface 2100, a memory 2200, and a processor 2300.

The communication interface 2100 may include a communication circuit. The communication interface 2100 may include a communication circuit capable of performing data communication between the server 2000 and other devices by using at least one of data communication methods including, for example, wired local area network (LAN), wireless LAN, Wi-Fi, Bluetooth, ZigBee, Wi-Fi Direct (WFD), Infrared Data Association (IrDA), Bluetooth Low Energy (BLE), near field communication (NFC), Wireless Broadband Internet (WiBro), World Interoperability for Microwave Access (WiMAX), Shared Wireless Access Protocol (SWAP), Wireless Gigabit Alliance (WiGig), and radio frequency (RF) communication.

The communication interface 2100 may transmit and receive data necessary for performing an operation of the server 2000 to and from an external electronic device. For example, the server 2000 may receive a spatial map from an electronic device (e.g., a user's smartphone, a robot cleaner, etc.) external to the server 2000 via the communication interface 2100. The spatial map may include a first spatial map and/or a second spatial map. In addition, the server 2000 may transmit and receive a personalized spatial map and/or various pieces of data for displaying a virtual space generated based on the personalized spatial map to and from the user's electronic device 3000 via the communication interface 2100.

The memory 2200 may store instructions, data structures, and program code readable by the processor 2300. The memory 2200 may be configured as one or more memories. In embodiments of the disclosure, operations performed by the processor 2300 may be implemented by executing instructions or code of a program stored in the memory 2200.

The memory 2200 may include non-volatile memories, such as read-only memory (ROM) (e.g., programmable ROM (PROM), erasable PROM (EPROM), electrically erasable PROM (EEPROM)), flash memory (e.g., memory card and solid-state drive (SSD)), and analog recording type memory (e.g., hard disk drive (HDD), magnetic tape, and optical disc), and volatile memories, such as random access memory (RAM) (e.g., dynamic RAM (DRAM) and static RAM (SRAM)).

The memory 2200 may store one or more instructions and programs that cause the server 2000 to operate to generate a personalized spatial map. For example, a spatial map processing module 2210, an AI module 2220, and a personalized spatial map generation module 2230 may be stored in the memory 2200.

The processor 2300 may control all operations of the server 2000. For example, the processor 2300 may execute one or more instructions of a program stored in the memory 2200 to control all operations performed by the server 2000 to generate a personalized spatial map. The processor 2300 may be configured as one or more processors.

The one or more processors 2300 may include at least one of a central processing unit (CPU), a graphics processing unit (GPU), an accelerated processing unit (APU), a many integrated core (MIC), a digital signal processor (DSP), or a neural processing unit (NPU). The one or more processors 2300 may be implemented in the form of an integrated system on a chip (SoC) including one or more electronic components. The one or more processors 2300 may be each implemented as separate hardware (H/W).

The processor 2300 may perform overall management and analysis tasks on spatial maps by using the spatial map processing module 2210. The processor 2300 may obtain the first spatial map and the second spatial map, and classify and store spatial maps obtained for each space as a first spatial map or a second spatial map. The processor 2300 may tag pieces of feature attribute information representing spatial information onto the first spatial map and/or the second spatial map. The processor 2300 may align the first spatial map with the second spatial map. When the first spatial map and the second spatial map have different spatial dimensions, the processor 2300 may project a higher dimensional spatial map into a lower dimension. Descriptions related to the operations of the spatial map processing module 2210 have already been provided with reference to the foregoing drawings, and thus, are not repeated for brevity.

The processor 2300 may use the AI module 2220 to perform all tasks in which AI is used. The AI module 2220 may include one or more AI models implemented as data structures simulating artificial neural networks. For example, the AI module 2220 may include, but is not limited to, an object recognition model, an object detection model, a spatial change detection model, and a GAN for generating training data.

The processor 2300 may use the AI module 2220 to execute an AI model used to identify changes in the space and process data obtained from the AI model. The processor 2300 may execute, for example, the spatial change detection model. As the spatial change detection model is executed, the aligned first spatial map and second spatial map may be input to the spatial change detection model, and information about local areas in which differences exist between the first spatial map and the second spatial map may be output.

The processor 2300 may train an AI model by using the AI module 2220. The processor 2300 may train the spatial change detection model by using, for example, training data from the first spatial maps and the second spatial maps included in a training dataset.

Descriptions related to the operations of the AI module 2220 have already been provided with reference to the foregoing drawings, and thus, are not repeated for brevity.

The processor 2300 may generate and manage a personalized spatial map by using the personalized spatial map generation module 2230. The processor 2300 may generate a personalized spatial map including personalized spatial information in several ways. The processor 2300 may use, for example, the first spatial map as a base map. The processor 2300 may generate a personalized spatial map by updating map features from the second spatial map in the first spatial map. Alternatively, the processor 2300 may use the second spatial map as a base map. The processor 2300 may use the second spatial map as a base map, but update map features in the second spatial map based on a result of comparison between the first spatial map and the second spatial map.

Descriptions related to the operations of the personalized spatial map generation module 2230 have already been provided with reference to the foregoing drawings, and thus, are not repeated for brevity.

Moreover, the modules stored in the memory 2200 and executed by the processor 2300 are for convenience of description and are not necessarily limited thereto. Other modules may be added to implement the above-described embodiments of the disclosure, and a module may be subdivided into a plurality of modules distinguished according to its detailed functions, and some of the above-described modules may be combined to form a single module.

When a method according to an embodiment of the disclosure includes a plurality of operations, the plurality of operations may be performed by one processor or a plurality of processors. For example, when a first operation, a second operation, and a third operation are performed according to a method of an embodiment of the disclosure, the first operation, the second operation, and the third operation may all be performed by a first processor, and the first operation and the second operation may be performed by the first processor (e.g., a general-purpose processor) while the third operation may be performed by a second processor (e.g., a dedicated AI processor). The dedicated AI processor, which is an example of the second processor, may perform computations for training/inference of AI models. However, embodiments of the disclosure are not limited thereto.

The one or more processors 2300 according to the disclosure may be implemented as a single-core processor or as a multi-core processor.

When a method according to an embodiment of the disclosure includes a plurality of operations, the plurality of operations may be performed by one core or a plurality of cores included in the one or more processors 2300.

Figure 13:
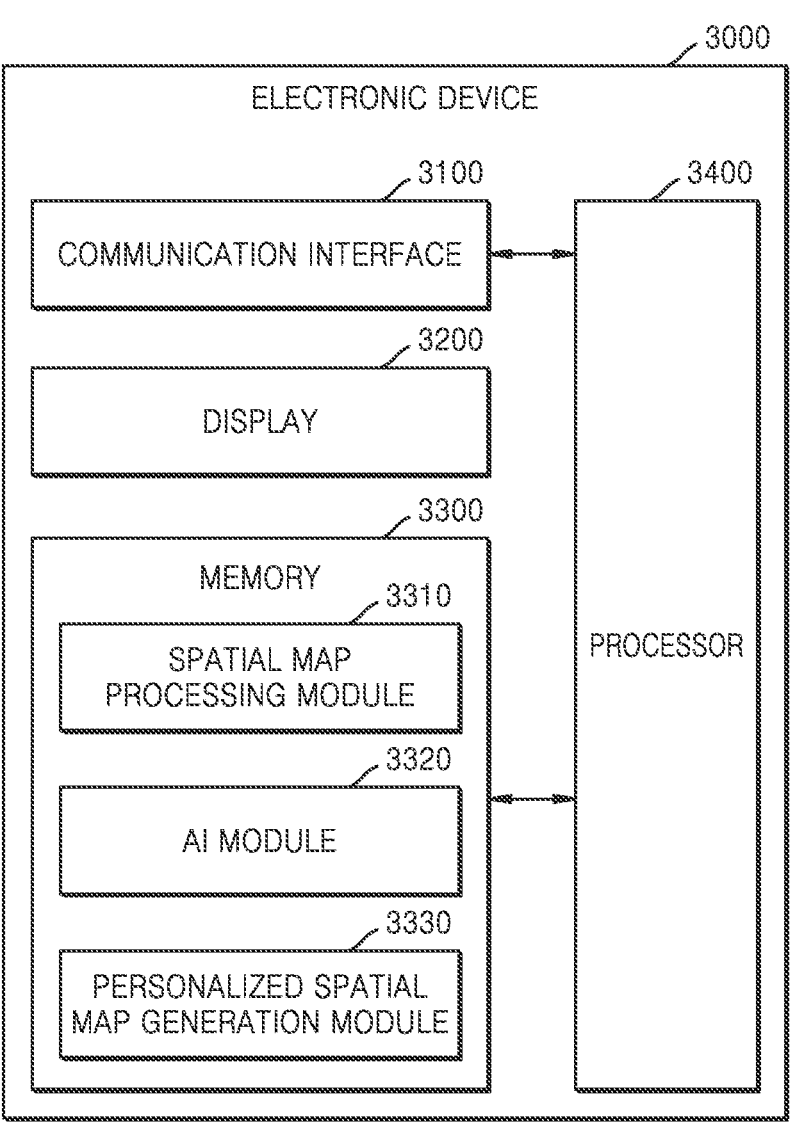
FIG. 13 is a block diagram of a configuration of an electronic device, according to an embodiment of the disclosure.

FIG. 13 is a block diagram of a configuration of an electronic device according to an embodiment of the disclosure.

In an embodiment of the disclosure, the above-described operations of the server 2000 may also be performed by an electronic device 3000.

According to an embodiment of the disclosure, the electronic device 3000 may include a communication interface 3100, a display 3200, a memory 3300, and a processor 3400. Because the communication interface 3100, the memory 3300, and the processor 3400 of the electronic device 3000 respectively correspond to the communication interface 2100, the memory 2200, and the processor 2300 of the server 2000 of FIG. 12, descriptions already provided above with respect to the components are omitted.

The display 3200 may output information processed by the electronic device 3000. Moreover, when the display 3200 and a touch pad form a layer structure to construct a touch screen, the display 3200 may be used as an input device as well as an output device. The display 3200 may include at least one of a liquid crystal display (LCD), a thin-film-transistor LCD (TFT LCD), an organic light-emitting diode (OLED) display, a flexible display, a 3D display, a micro display, or an HMD. The electronic device 3000 may display, on the display 3200, a personalized spatial map and/or a virtual space corresponding to the personalized spatial map.

The electronic device 3000 may further include one or more cameras and/or one or more sensors. The electronic device 3000 may perform 3D scan on a space by using the one or more cameras and/or the one or more sensors. For example, the one or more cameras and/or the one or more sensors may include, but are not limited to, an RGB-D sensor, a ToF sensor, a lidar sensor, a radar sensor, etc.

Also, the electronic device 3000 may further include an input/output (I/O) interface. The I/O interface may include an input interface for receiving a user's input and an output interface for outputting signals other than image/video signals output from the display 3200.

The input interface is for receiving an input from the user. The input interface may include, but is not limited to, at least one of a keypad, a dome switch, a touch pad (a capacitive overlay type, a resistive overlay type, an infrared beam type, a surface acoustic wave type, an integral strain gauge type, a piezoelectric type, etc.), a jog wheel, or a jog switch.

The output interface may include a speaker. The speaker may output an audio signal received from the communication interface 3100 or stored in the memory 3300.

The disclosure presents a method of generating a personalized spatial map including spatial information about a user's real-world space by identifying changes in a space and updating a spatial map based on classification of the changes by using a pre-generated first spatial map and a second spatial map generated based on sensor data obtained by measuring the space.

The technical solutions to be achieved in the disclosure are not limited to those described above, and other technical solutions not described will be clearly understood by one of ordinary skill in the art from the following description.

According to an aspect of the disclosure, a method, performed by a server, of providing a personalized spatial map may be provided.

The method may include obtaining a pre-generated first spatial map including first map features representing spatial information about a space.

The method may include obtaining a second spatial map generated based on sensor data obtained by measuring the space. The second spatial map may include second map features.

The method may include selecting map features for map alignment from among the first map features and the second map features.

The method may include aligning the first spatial map and the second spatial map based on the selected map features.

The method may include identifying local areas in the space where differences exist between the first spatial map and the second spatial map.

The method may include generating a personalized spatial map by determining pieces of spatial information about the local areas based on the second map features.

The map features including the first map features and the second map features may include at least one of spatial layout information, information related to an object in the space, or spatial 3D information.

The method may include, based on a spatial dimension of the first spatial map being different from that of the second spatial map, projecting a higher dimensional spatial map among the first spatial map and the second spatial map to correspond to a spatial dimension of the lower dimensional spatial map.

The selecting of the map features for the map alignment may include tagging the first map features and the second map features with pieces of feature attribute information.

The aligning of the first spatial map and the second spatial map may include aligning the first spatial map and the second spatial map such that the first spatial map and the second spatial map overlap based on the tagged first map features and the tagged second map features.

The aligning of the first spatial map and the second spatial map may include calculating a confidence score representing a similarity between each of the first map features in the first spatial map and each of the second map features in the second spatial map corresponding to each of the first map features.

The aligning of the first spatial map and the second spatial map may include removing map features whose confidence scores are less than a threshold from among the first map features and the second map features.

The identifying of the local areas in the space where the differences exist between the first spatial map and the second spatial map may include comparing the first spatial map with the second spatial map.

The identifying of the local areas in the space where the differences exist between the first spatial map and the second spatial map may include classifying local areas changed in the second spatial map relative to the first spatial map.

The generating of the personalized spatial map may include generating a personalized spatial map by determining pieces of spatial information about the local areas, based on the second map features and the classification of the local areas.

The changed local areas may be classified into at least one of a local area where an object is changed or a local area containing measurement noise.

The identifying of the local areas in the space where the differences exist between the first spatial map and the second spatial map may include identifying the local areas by using a spatial change detection model.

The spatial change detection model may take the first spatial map and the second spatial map as an input and output information about the local areas.

The method may include obtaining a 3D spatial map of at least some local areas among a plurality of local areas in the space.

The method may include updating, based on map features in the 3D spatial map, spatial information about the at least some local areas within the personalized spatial map.

The method may include generating, based on the personalized spatial map, a personalized virtual space corresponding to the personalized spatial map.

According to an aspect of the disclosure, a server for providing a personalized spatial map may be provided. The server may include a communication interface, a memory storing one or more instructions, and at least one processor configured to execute the one or more instructions stored in the memory.

The at least one processor may execute the one or more instructions to obtain, via the communication interface, a pre-generated first spatial map including first map features representing spatial information about a space.

The at least one processor may execute the one or more instructions to obtain, via the communication interface, a second spatial map generated based on sensor data obtained by measuring the space. The second spatial map may include second map features.

The at least one processor may execute the one or more instructions to select map features for map alignment from among the first map features and the second map features.

The at least one processor may execute the one or more instructions to align the first spatial map and the second spatial map based on the selected map features.

The at least one processor may execute the one or more instructions to identify local areas in the space where differences exist between the first spatial map and the second spatial map.

The at least one processor may execute the one or more instructions to generate a personalized spatial map by determining pieces of spatial information about the local areas based on the second map features.

The map features including the first map features and the second map features may include at least one of spatial layout information, information related to an object in the space, or spatial 3D information.

The at least one processor may execute the one or more instructions to, based on a spatial dimension of the first spatial map being different from that of the second spatial map, project a higher dimensional spatial map among the first spatial map and the second spatial map to correspond to a spatial dimension of the lower dimensional spatial map.

The at least one processor may execute the one or more instructions to tag the first map features and the second map features with pieces of feature attribute information.

The at least one processor may execute the one or more instructions to align the first spatial map and the second spatial map such that the first spatial map and the second spatial map overlap based on the tagged first map features and the tagged second map features.

The at least one processor may execute the one or more instructions to calculate a confidence score representing a similarity between each of the first map features in the first spatial map and each of the second map features in the second spatial map corresponding to each of the first map features.

The at least one processor may execute the one or more instructions to remove map features whose confidence scores are less than a threshold from among the first map features and the second map features.

The at least one processor may execute the one or more instructions to compare the first spatial map with the second spatial map.

The at least one processor may execute the one or more instructions to classify local areas changed in the second spatial map relative to the first spatial map.

The at least one processor may execute the one or more instructions to generate a personalized spatial map by determining pieces of spatial information about the local areas, based on the second map features and the classification of the local areas.

The changed local areas may be classified into at least one of a local area where an object is changed or a local area containing measurement noise The at least one processor may execute the one or more instructions to identify the local areas by using a spatial change detection model.

The spatial change detection model may take the first spatial map and the second spatial map as an input and output information about the local areas.

The at least one processor may execute the one or more instructions to obtain a 3D spatial map of at least some local areas among a plurality of local areas in the space.

The at least one processor may execute the one or more instructions to update, based on map features in the 3D spatial map, spatial information about the at least some local areas within the personalized spatial map.

Moreover, embodiments of the disclosure may also be implemented in the form of recording media including instructions executable by a computer, such as a program module executed by the computer. The computer-readable recording media may be any available media that are accessible by a computer and include both volatile and nonvolatile media and both removable and non-removable media. Furthermore, the computer-readable recording media may include both computer storage media and communication media. The computer storage media include both volatile and nonvolatile media and both removable and non-removable media implemented using any method or technology for storage of information such as computer-readable instructions, data structures, program modules, or other data. The communication media typically embody computer-readable instructions, data structures, program modules, or other data in a modulated data signal.

A computer-readable storage medium may be provided in the form of a non-transitory storage medium. In this regard, the term 'non-transitory storage medium' only means that the storage medium is a tangible device and does not include a signal (e.g., an electromagnetic wave), and the term does not differentiate between where data is semi-permanently stored in the storage medium and where the data is temporarily stored in the storage medium. For example, the 'non-transitory storage medium' may include a buffer for temporarily storing data.

According to an embodiment of the disclosure, methods according to various embodiments of the disclosure may be included in a computer program product when provided. The computer program product may be traded, as a product, between a seller and a buyer. The computer program product may be distributed in the form of a computer-readable storage medium (e.g., compact disc ROM (CD-ROM)) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the computer-readable storage medium such as a memory of a server of a manufacturer, a server of an application store, or a relay server.

The above description of the disclosure is provided for illustration, and it will be understood by those of ordinary skill in the art that changes in form and details may be readily made therein without departing from technical idea or essential features of the disclosure. Accordingly, the above embodiments of the disclosure and all aspects thereof are merely examples and are not limiting. For example, each component defined as an integrated component may be implemented in a distributed fashion, and likewise, components defined as separate components may be implemented in an integrated form.

Any changes or modifications within the meaning and scope of the appended claims and their equivalents will be construed as being included in the scope of the disclosure.

What is claimed is:

1. A method, performed by a server, of providing a personalized spatial map, the method comprising:
obtaining a first spatial map including first map features representing spatial information about a space;
obtaining a second spatial map based on sensor data obtained by measuring the space, the second spatial map including second map features;
identifying third map features for map alignment from among the first map features and the second map features;
aligning the first spatial map and the second spatial map, based on the identified third map features;
identifying local areas in the space where at least one difference exists between the first spatial map and the second spatial map, wherein the identifying the local areas comprises:
comparing the first spatial map with the second spatial map; and
classifying local areas changed in the second spatial map relative to the first spatial map; and
generating the personalized spatial map by identifying pieces of spatial information about the local areas based on the second map features and the classified local areas.

2. The method of claim 1, wherein map features including the first map features and the second map features comprise at least one of spatial layout information, information related to an object in the space, or spatial three-dimensional (3D) information.

3. The method of claim 1, further comprising, based on a spatial dimension of the first spatial map being different from a spatial dimension of the second spatial map, projecting a higher dimensional spatial map among the first spatial map and the second spatial map to correspond to a spatial dimension of a lower dimensional spatial map.

4. The method of claim 1, wherein the identifying of the third map features for the map alignment comprises:
tagging the first map features and the second map features with pieces of feature attribute information, and
wherein the aligning of the first spatial map and the second spatial map comprises:
aligning the first spatial map and the second spatial map such that the first spatial map and the second spatial map overlap based on the tagged first map features and the tagged second map features.

5. The method of claim 1, wherein the aligning of the first spatial map and the second spatial map comprises:
identifying a confidence score representing a similarity between each of the first map features in the first spatial map and each of the second map features in the second spatial map corresponding to each of the first map features; and
removing fourth map features that have confidence scores less than a predetermined threshold from among the first map features and the second map features.

6. The method of claim 1, wherein the changed local areas are classified into at least one of a local area where an object is changed or a local area containing measurement noise.

7. The method of claim 1, wherein the identifying of the local areas in the space where the at least one difference exists between the first spatial map and the second spatial map comprises identifying the local areas by using a spatial change detection model that takes the first spatial map and the second spatial map as an input and outputs information about the local areas.

8. The method of claim 1, further comprising:
obtaining a 3D spatial map of at least one local area among a plurality of local areas in the space; and
updating, based on fifth map features in the 3D spatial map, spatial information about the at least one local area within the personalized spatial map.

9. The method of claim 1, further comprising generating, based on the personalized spatial map, a personalized virtual space corresponding to the personalized spatial map.

10. A server for providing a personalized spatial map, the server comprising:
a communication interface;
at least one memory configured to store one or more instructions; and
at least one processor configured to execute the one or more instructions stored in the at least one memory to:
obtain, via the communication interface, a first spatial map including first map features representing spatial information about a space,
obtain, via the communication interface, a second spatial map based on sensor data obtained by measuring the space, the second spatial map including second map features,
identify third map features for map alignment from among the first map features and the second map features, align the first spatial map and the second spatial map based on the identified third map features, identify local areas in the space where at least one difference exists between the first spatial map and the second spatial map, by:

comparing the first spatial map with the second spatial map; and classifying local areas changed in the second spatial map relative to the first spatial map, and generate the personalized spatial map by identifying pieces of spatial information about the local areas based on the second map features and the classified local areas.

11. The server of claim 10, wherein map features including the first map features and the second map features comprise at least one of spatial layout information, information related to an object in the space, or spatial three-dimensional (3D) information.

12. The server of claim 10, wherein the at least one processor is further configured to execute the one or more instructions to, based on a spatial dimension of the first spatial map being different from a spatial dimension of the second spatial map, project a higher dimensional spatial map among the first spatial map and the second spatial map to correspond to a spatial dimension of a lower dimensional spatial map.

13. The server of claim 10, wherein the at least one processor is further configured to execute the one or more instructions to:

tag the first map features and the second map features with pieces of feature attribute information, and align the first spatial map and the second spatial map such that the first spatial map and the second spatial map overlap based on the tagged first map features and the tagged second map features.

14. The server of claim 10, wherein the at least one processor is further configured to execute the one or more instructions to:

identify a confidence score representing a similarity between each of the first map features in the first spatial map and each of the second map features in the second spatial map corresponding to each of the first map features, and remove fourth map features that have confidence scores less than a predetermined threshold from among the first map features and the second map features.

15. The server of claim 10, wherein the changed local areas are classified into at least one of a local area where an object is changed or a local area containing measurement noise.

16. The server of claim 10, wherein the at least one processor is further configured to execute the one or more instructions to identify the local areas by using a spatial change detection model that takes the first spatial map and the second spatial map as an input and output information about the local areas.

17. The server of claim 10, wherein the at least one processor is further configured to execute the one or more instructions to obtain a 3D spatial map of at least one local area among a plurality of local areas in the space, and update, based on map features in the 3D spatial map, spatial information about the at least one local area within the personalized spatial map.

18. A non-transitory computer-readable recording medium having recorded thereon a program for providing a personalized spatial map by executing a method comprising:

obtaining a first spatial map including first map features representing spatial information about a space;

obtaining a second spatial map based on sensor data obtained by measuring the space, the second spatial map including second map features;

identifying third map features for map alignment from among the first map features and the second map features;

aligning the first spatial map and the second spatial map, based on the identified third map features;

identifying local areas in the space where at least one difference exists between the first spatial map and the second spatial map, wherein the identifying the local areas comprises:

comparing the first spatial map with the second spatial map; and classifying local areas changed in the second spatial map relative to the first spatial map; and generating the personalized spatial map by identifying pieces of spatial information about the local areas based on the second map features and the classified local areas.

* * * * *